(12) United States Patent
Komiya et al.

(10) Patent No.: US 9,079,501 B2
(45) Date of Patent: Jul. 14, 2015

(54) VEHICLE DRIVING DEVICE, VEHICLE CHARGING SYSTEM, AND AUTOMOBILE

(75) Inventors: Kenji Komiya, Osaka (JP); Akihide Shibata, Osaka (JP); Masaru Nomura, Osaka (JP); Yoshiji Ohta, Osaka (JP); Hiroshi Iwata, Osaka (JP)

(73) Assignee: SHARP KABUSHIKI KAISHA, Osaka-shi (JP)

( * ) Notice: Subject to any disclaimer, the term of this patent is extended or adjusted under 35 U.S.C. 154(b) by 312 days.

(21) Appl. No.: 13/595,661

(22) Filed: Aug. 27, 2012

(65) Prior Publication Data

US 2013/0054069 A1 Feb. 28, 2013

(30) Foreign Application Priority Data

Aug. 29, 2011 (JP) ................................. 2011-186112
Mar. 19, 2012 (JP) ................................. 2012-062566

(51) Int. Cl.
| G05D 1/00 | (2006.01) |
| B60L 1/00 | (2006.01) |
| B60L 1/06 | (2006.01) |
| B60L 1/16 | (2006.01) |
| B60L 3/00 | (2006.01) |
| B60L 3/04 | (2006.01) |
| B60L 8/00 | (2006.01) |
| B60L 11/18 | (2006.01) |
| B60L 15/00 | (2006.01) |

(52) U.S. Cl.
CPC . *B60L 1/003* (2013.01); *B60L 1/06* (2013.01); *B60L 1/16* (2013.01); *B60L 3/0046* (2013.01); *B60L 3/04* (2013.01); *B60L 8/003* (2013.01); *B60L 11/1859* (2013.01); *B60L 11/1868* (2013.01); *B60L 15/007* (2013.01); *B60L 2200/26* (2013.01); *B60L 2210/10* (2013.01); *B60L 2240/34* (2013.01); *B60L 2240/36* (2013.01); *B60L 2240/547* (2013.01); *B60L 2240/549* (2013.01); *Y02T 10/7005* (2013.01); *Y02T 10/7011* (2013.01); *Y02T 10/7066* (2013.01); *Y02T 10/7083* (2013.01); *Y02T 10/7216* (2013.01); *Y02T 90/16* (2013.01)

(58) Field of Classification Search
CPC ...... B60L 1/003; B60L 1/06; B60L 2240/549
USPC ............................................................ 701/22
See application file for complete search history.

(56) References Cited

U.S. PATENT DOCUMENTS

| 2007/0125417 A1* | 6/2007 | Johanson et al. | 136/244 |
| 2009/0266397 A1* | 10/2009 | Gibson et al. | 136/244 |
| 2010/0090527 A1* | 4/2010 | Tarnowsky et al. | 307/10.7 |
| 2010/0116565 A1* | 5/2010 | Jang et al. | 180/2.2 |
| 2011/0089887 A1* | 4/2011 | Ward | 320/101 |
| 2011/0162897 A1* | 7/2011 | Syed et al. | 180/2.2 |
| 2011/0163710 A1* | 7/2011 | Syed et al. | 320/101 |
| 2012/0133322 A1* | 5/2012 | Walsh et al. | 320/101 |

(Continued)

FOREIGN PATENT DOCUMENTS

| JP | 5-168172 | 7/1993 |
| JP | 2000-116010 | 4/2000 |
| JP | 2005-115441 | 4/2005 |

(Continued)

*Primary Examiner* — Ian Jen
(74) *Attorney, Agent, or Firm* — Morrison & Foerster LLP

(57) ABSTRACT

A vehicle driving device is arranged such that in accordance with an instruction signal from the outside, a first battery managing section outputs, to the outside, a signal related to charging/discharging control for a first battery.

6 Claims, 14 Drawing Sheets

(56) References Cited

U.S. PATENT DOCUMENTS

| | | | |
|---|---|---|---|
| 2012/0136534 A1* | 5/2012 | Walsh et al. | 701/36 |
| 2012/0146572 A1* | 6/2012 | Ward | 320/101 |
| 2012/0161526 A1* | 6/2012 | Huang et al. | 307/77 |
| 2012/0181990 A1* | 7/2012 | Asakura et al. | 320/137 |
| 2012/0206104 A1* | 8/2012 | Tsuchiya | 320/134 |
| 2012/0299377 A1 | 11/2012 | Masuda et al. | |
| 2013/0116828 A1* | 5/2013 | Krause et al. | 700/264 |

FOREIGN PATENT DOCUMENTS

| | | |
|---|---|---|
| JP | 2006-315461 | 11/2006 |
| WO | WO 2010/083435 | 7/2010 |
| WO | WO 2010083435 A1 * | 7/2010 |
| WO | WO 2011/099116 | 8/2011 |

* cited by examiner

VEHICLE DRIVING DEVICE, VEHICLE CHARGING SYSTEM, AND AUTOMOBILE

This Nonprovisional application claims priority under 35 U.S.C. §119 on Patent Application No. 2011-186112 filed in Japan on Aug. 29, 2011 and Patent Application No. 2012-062566 filed in Japan on Mar. 19, 2012, the entire contents of which are hereby incorporated by reference.

TECHNICAL FIELD

The present invention relates to a vehicle such as an automobile and an electric train. More particularly, the present invention relates to a vehicle charging system in which a battery can be charged by an electric power control section that is included in a vehicle driving device including, mounted therein, (i) a drive motor and (ii) a battery for driving the drive motor and that is provided separately from a main control section of the vehicle.

BACKGROUND ART

Recent years have witnessed active use of natural energy, such as wind power generation and solar photovoltaic power generation, for the purpose of solving energy-related problems.

Recent years have also witnessed growing potential of widespread use of an electric automobile, an electric two-wheeled vehicle and the like for the purpose of solving environment-related problems.

The above purposes have led to a gradually increasing practical application of an attempt to mount a solar photovoltaic power generation panel on an electric automobile so that energy generated by the solar photovoltaic power generation panel is used by the electric automobile.

FIG. 13 is a diagram illustrating a system configuration of a conventional air-conditioning device 10 for a vehicle, and corresponds to FIG. 1 of Patent Literature 1. The air-conditioning device 10 of FIG. 13 for a vehicle includes: a first battery 14 (solar battery); a second battery 16; a compressor 22 for cooling air inside a vehicle room; an electric heater 24 for heating the air inside the vehicle room; and a blower motor 20 for replacing the air inside the vehicle room with air outside the vehicle room.

The above air-conditioning device, in the case where the first battery 14 has a sufficient amount of remaining electric power, carries out air-conditioning control with use of the compressor 22 or electric heater 24 on the electric power of the first battery 14.

On the other hand, in the case where the first battery 14 does not have a sufficient amount of remaining electric power, the above air-conditioning device carries out air-blowing control with use of the blower motor 20 on the electric power of the first battery 14 if (i) the outside air has a temperature that is closer to a target temperature than is the temperature of the inside air or (ii) the target temperature is between the temperature of the outside air and that of the inside air.

If the outside air has a temperature that is not closer to the target temperature than is the temperature of the inside air, the above air-conditioning device carries out air-conditioning control with use of the compressor 22 or electric heater 24 on electric power of the second battery 16.

CITATION LIST

Patent Literature 1

Japanese Patent Application Publication, Tokukai, No. 2006-315461 A (Publication Date: Nov. 24, 2006)

SUMMARY OF INVENTION

Technical Problem

The attempt to use, for an electric automobile, energy generated by a solar photovoltaic power generation panel has been gradually put into practical use as described above. Such use of natural energy (for example, solar photovoltaic energy), however, merely allows only a small amount of electric power to be generated (approximately 0 W to 1000 W), and such electric power generation is unstable as well.

The above problem makes it undesirable, in terms of reliability in stable and safe driving and the like, to supply, directly to a driving section of a drive motor, electric power (that is, electric power generated with use of natural energy) generated using natural energy.

Further, there is another problem: An electric automobile may store, in a storage battery, electric power generated with use of natural energy. In such a case, the electric automobile typically uses, as a storage battery (hereinafter referred to as "main battery") for driving a drive motor, a lithium-ion battery, which requires prevention of overcharge and overdischarge. Thus, an electric automobile includes a lithium-ion battery as a source of driving electric power while preventing overcharge and overdischarge by carrying out fine charging/discharging control with use of members such as (i) a main control section (hereinafter referred to as "main CPU") for governing control of, for example, driving of the electric automobile and (ii) a battery managing unit (hereinafter referred to as "BMU"). It is thus difficult in terms of safety to store unstable electric power, generated with use of natural energy, in the main battery while the electric automobile is being driven.

In the case where an electric automobile stores, directly in the main battery while the electric automobile is not being driven, electric power generated with use of natural energy, the main CPU needs to stay active for that purpose only. The main CPU, however, generally consumes a large amount of electric power (for example, approximately 50 W) because it carries out an extremely large number of controls over, for example, (i) driving of the automobile and (ii) coordination between pieces of the equipment. As a result, a large part of electric power generated with use of natural energy is consumed by the main CPU, which significantly decreases the charging efficiency of the electric automobile.

The present invention has been accomplished in view of the above problems with conventional art. It is an object of the present invention to provide a vehicle driving device, a vehicle charging system, and an automobile each of which is capable of using supplied electric power with high efficiency.

Solution to Problem

In order to solve the above problems, a vehicle driving device of the present invention includes: a motor driving section for driving a drive motor that drives a vehicle; a first battery managing section for managing an amount of electric power stored in a first battery that supplies driving electric power to the motor driving section; and a first control section for providing an instruction to the motor driving section in order to control the driving of the drive motor, the first battery managing section communicating with outside so that the first battery is charged or discharged from the outside.

The above arrangement allows the first battery managing section to, even while the first control section is not in operation, charge or discharge the first battery in response to an instruction signal from outside. The above arrangement thus eliminates the need to operate the first control section, which governs control of the entire vehicle driving device and which consumes a large amount of electric power, in order to merely charge and discharge the first battery without supply of electric power from the first battery to the motor driving section. This makes it possible to reduce power consumption of the vehicle driving device. The above arrangement consequently makes it possible to provide a vehicle driving device having reduced power consumption and improved power efficiency.

In order to solve the above problems, a vehicle driving device of the present invention includes: a motor driving section for driving a drive motor that drives a vehicle; a first battery managing section for managing an amount of electric power stored in a first battery that supplies driving electric power to the motor driving section; and a first control section for providing an instruction to the motor driving section in order to control the driving of the drive motor, the first battery managing section autonomously charging or discharging the first battery while the first control section is not in operation.

The above arrangement allows the first battery managing section to, even while the first control section is not in operation, autonomously charge or discharge the first battery. The above arrangement consequently makes it possible to provide a vehicle driving device having reduced power consumption and improved power efficiency.

Advantageous Effects of Invention

The present invention makes it possible to provide a vehicle driving device having reduced power consumption and improved power efficiency.

DESCRIPTION OF EMBODIMENTS

Figure 1:
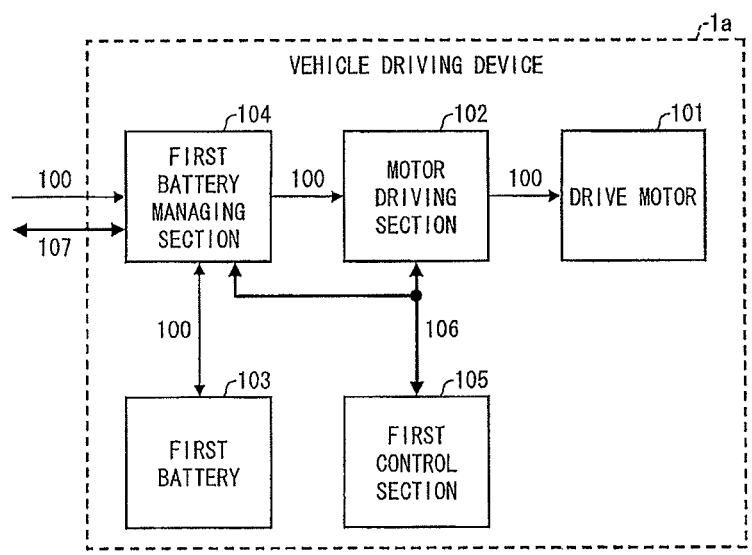
FIG. 1 is a block diagram illustrating a vehicle driving device of a first embodiment of the present invention.

The description below deals in detail with the present invention on the basis of an embodiment illustrated in the drawings. The description below first deals with an embodiment of the present invention with reference to FIGS. 1 through 12 and Table 1.

Figure 2:
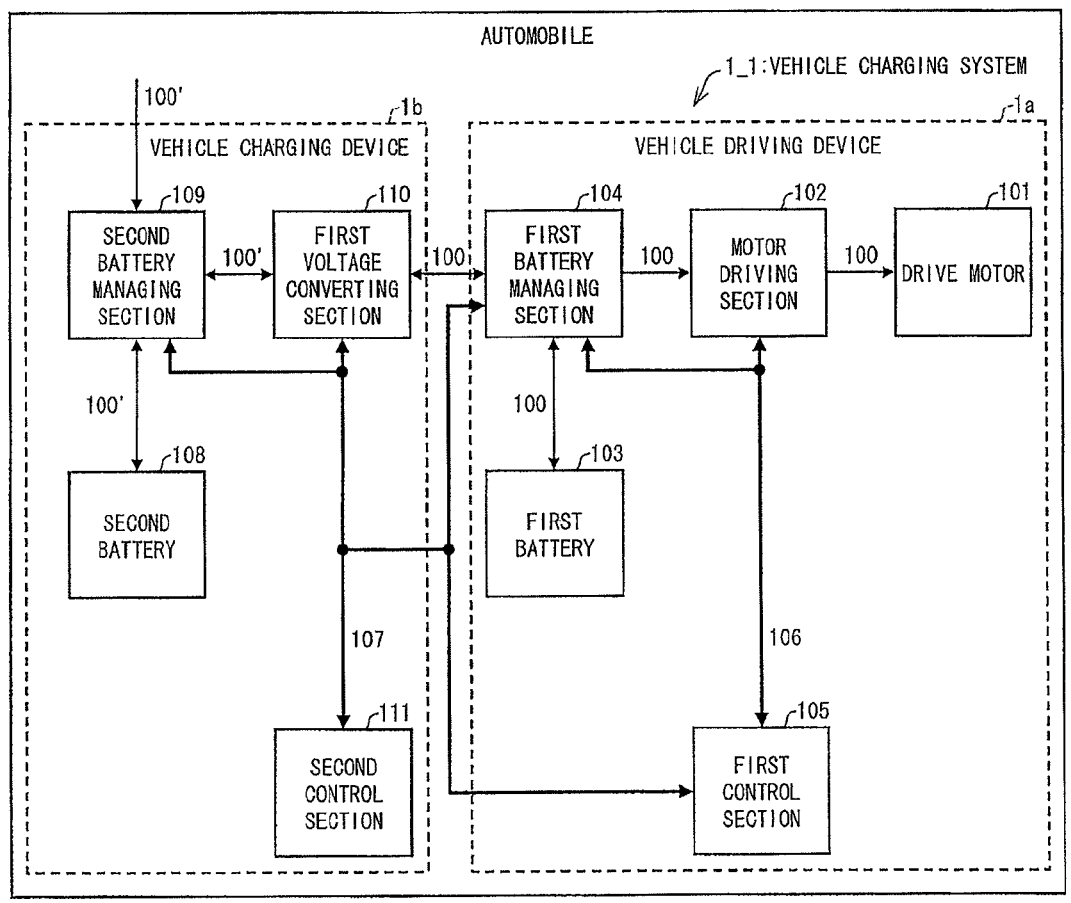
FIG. 2 is a block diagram illustrating a vehicle charging system of the first embodiment of the present invention.

FIG. 2 is a block diagram illustrating a vehicle charging system 1_1 of a first embodiment of the present invention. The present embodiment describes an electric automobile (automobile) as an example of the vehicle. The vehicle charging system 1_1 is, however, also usable in a hybrid automobile or plug-in hybrid automobile.

The vehicle charging system 1_1 of FIG. 2 includes a vehicle driving device 1a and a vehicle charging device 1b. The vehicle driving device 1a includes: a drive motor 101; a motor driving section 102; a first battery 103 (for example, a high-voltage battery of 300 V); a first battery managing section 104; and a first control section 105. While the drive motor 101 and the first battery 103 in FIG. 2 are provided inside the vehicle driving device 1a, the present invention is not limited to such a configuration: The drive motor 101 and the first battery 103 may alternatively be provided outside the vehicle driving device 1a.

(Vehicle Driving Device 1a)

FIG. 1 is a block diagram illustrating the vehicle driving device 1a of the first embodiment of the present invention. The vehicle driving device 1a is arranged such that (i) the motor driving section 102 drives the drive motor 101 serving as a motor for driving the vehicle and that (ii) the first battery 103 supplies electric power 100 (driving electric power) to the motor driving section 102 through the first battery managing section 104.

The first battery managing section 104, which manages the amount of electric power stored in the first battery 103, operates as described below.

First, while the first control section 105 is in operation, the first battery managing section 104 discharges the first battery 103 in accordance with an instruction from the first control section 105 in order to supply electric power 100 to the motor driving section 102. The first battery managing section 104 may, (i) in accordance with an instruction from the first control section 105, charge the first battery 103 with electric power 100 supplied from the outside, or (ii) discharge the first battery 103 by causing it to supply electric power 100 to the outside.

Second, the first battery managing section 104 can further charge and discharge the first battery 103 (i) without receiving an instruction from the first control section 105 and (ii) in response to an instruction signal (that is, at least one signal among a second communication signal group 107) from the outside. The first battery managing section 104, in this case, (i) charges the first battery 103 by supplying the first battery 103 with electric power 100 from the outside and (ii) discharges the first battery 103 by causing it to supply electric power 100 to the outside. Further, in the above case, the first battery managing section 104 supplies, to the outside, a signal (that is, at least one signal among the second communication signal group 107) related to charging/discharging control for the first battery 103.

Third, the first battery managing section 104 can also detect, without receiving an instruction from the first control section 105 or instruction signal from the outside, (i) the state of the first battery 103 and (ii) capability of supply of electric power 100 from the outside in order to autonomously charge and discharge the first battery 103. The first battery managing section 104, in this case, (i) charges the first battery 103 by supplying the first battery 103 with electric power 100 from the outside and (ii) discharges the first battery 103 by causing the first battery 103 to supply electric power 100 to the outside.

The first battery managing section 104 can, by monitoring the state of the first battery 103 for whether the first battery 103 is not overcharged or overdischarged, carry out, in order to prevent overcharge and overdischarge of the first battery 103, control over whether to cause the first battery 103 to (i) be charged with electric power 100 from the outside or (ii) discharge electric power 100 to the outside. This operation is carried out regardless of whether the first control section 105 is in operation.

The first battery managing section 104 included in the vehicle driving device 1a of the first embodiment of the present invention carries out the above first operation and additionally either or both of the second operation and the third operation. With this arrangement, even when the first control section 105 is not in operation (for instance, even in the case where a vehicle including the vehicle driving device 1a does not have an ignition key inserted therein), the first battery managing section 104 can cause the first battery 103 to, either in accordance with an instruction signal from the outside or autonomously, (i) be charged with electric power 100 from outside the vehicle driving device 1a and (ii) discharge electric power 100 to the outside of the vehicle driving device 1a.

The above arrangement allows the first battery managing section 104 to manage charging and discharging of the first battery 103 (main battery), and can thus prevent overdischarge and overcharge of a main battery.

Further, the above arrangement eliminates the need to operate the first control section 105, which governs control of the entire vehicle driving device 1a and which consumes a larger amount of electric power than does the first battery managing section 104, in order to merely charge and discharge the first battery 103 without supply of electric power from the first battery 103 to the motor driving section 102. This makes it possible to reduce power consumption.

The above arrangement consequently makes it possible to provide a vehicle driving device 1a that prevents overdischarge and overcharge of a main battery and that has reduced power consumption and improved power efficiency.

The first battery managing section 104 may, after outputting to the outside a signal among the second communication signal group 107 which signal is related to charging/discharging control, receive a signal, such as a signal of an instruction to charge the first battery and a signal of an instruction to discharge the first battery, from the outside as a response to the above outputted signal.

The term "outside" as used above refers specifically to the vehicle charging device 1b provided outside the vehicle driving device 1a.

While the first control section 105 is in operation, the first battery managing section 104 receives a signal indicating that the first control section 105 is in operation. Similarly, while the first control section 105 is not in operation, the first battery managing section 104 receives a signal (for example, a signal based on hardware which signal is automatically fixed to the GND level in the case where the hardware recognizes no output) indicating that the first control section 105 is not in operation. The above signals are among a first communication signal group 106. The first battery managing section 104 can, by receiving the above signals, determine whether the first control section 105 is in operation or not.

The first control section 105 operates as described below.

First, the first control section 105 gives an instruction to the motor driving section 102 in order to control driving of the drive motor 101: For instance, the first control section 105, while the vehicle is being driven, instructs the motor driving section 102 to (i) drive or stop the drive motor 101 or (ii) increase or decrease the number of revolutions of the drive motor 101.

Second, the first control section 105 gives an instruction to the first battery managing section 104 for transmission of electric power 100 through a first path (path) or second path described below.

The first path is the path "the first battery 103-> the first battery managing section 104-> the motor driving section 102". Transmitting electric power 100 through the first path can drive the drive motor 101.

The second path is the path "the outside-> (<-) the first battery managing section 104-> (<-) the first battery 103". Transmitting electric power 100 through the second path causes the first battery 103 to (i) be charged with electric power 100 from the outside or to (ii) discharge electric power 100 to the outside.

In the state where an ignition key for the vehicle is in the ON position, the first control section 105 is in operation (that is, active) regardless of whether the vehicle is being driven or not). The first control section 105, when in operation, monitors the respective states of the first battery managing section 104 and the motor driving section 102, and gives the above instructions to the first battery managing section 104 and the motor driving section 102 in correspondence with the respective states.

The first control section 105, the motor driving section 102, and the first battery managing section 104 transmit and receive the first communication signal group 106 to and from one another. This arrangement allows the first control section 105 to (i) give the above various instructions to the motor driving section 102 and to (H) give the above instruction to the first battery managing section 104.

(Vehicle Charging Device 1b)

The vehicle charging device 1b includes: a second battery 108 (for example, a low-voltage battery of 12 V); a second battery managing section 109; a first voltage converting section 110; and a second control section 111. The second battery 108 in FIG. 2 is provided inside the vehicle charging device 1b. The present invention is, however, not limited to such a configuration: The second battery 108 may alternatively be provided outside the vehicle charging device 1b.

The second battery 108 of the vehicle charging device 1b accumulates (stores) electric power 100' supplied from outside the vehicle charging system 1_1.

The second battery managing section 109, in accordance with an instruction from the second control section 111, (i) causes the second battery 108 to be charged with electric power 100' supplied from outside the vehicle charging device 1b, and (ii) supplies electric power 100' to the first voltage converting section 110 in order to cause the first battery 103 to be directly charged with electric power 100' supplied from outside the vehicle charging device 1b. The second battery managing section 109 also receives electric power 100' from the second battery 108 and supplies the electric power 100' thus obtained to the first voltage converting section 110.

The second battery managing section 109 may alternatively detect, without receiving an instruction from the second control section 111, (i) the state of the second battery 108 and (ii) capability of supply of electric power 100' from the outside of the vehicle charging device 1b in order to autonomously charge the second battery 108.

The second battery managing section 109 may alternatively, without receiving an instruction from the second control section 111, coordinate with the first battery managing section 104 in correspondence with transmission and receipt of the second communication signal group 107 in order to carry out the operation (1) or (2) below.

(1) Supply electric power 100' to the first voltage converting section 110 in order to cause the first battery 103 to be directly charged with electric power 100' supplied from outside the vehicle charging device 1b

(2) Transmit electric power between the first battery 103 and the second battery 108

The first voltage converting section 110 converts the voltage of electric power 100', obtained from the second battery 108, to provide electric power 100 as converted, which is then supplied to the first battery 103 through the first battery managing section 104. Similarly, the first voltage converting section 110 converts the voltage of electric power 100, obtained from the first battery 103, to provide electric power 100', which is then supplied to the second battery 108 through the second battery managing section 109. The first voltage converting section 110 is, however, not essential in the above arrangement, and may be omitted in the case where the electric power 100' has a voltage close to that of the electric power 100.

The second control section 111 operates as described below.

First, the second control section 111 receives (i) from the first battery managing section 104, a signal related to charging/discharging control for the first battery 103 and (ii) from the second battery managing section 109, a signal related to charging/discharging control for the second battery 108.

Second, the second control section 111 gives instructions to the second battery managing section 109, the first voltage converting section 110, and the first battery managing section 104 for transmission of electric power through a third path or fourth path described below.

The third path is the path "the second battery 108-> the second battery managing section 109-> the first voltage converting section 110->the first battery managing section 104-> the first battery 103". Transmitting electric power through the third path transmits electric power from the second battery 108 to the first battery 103.

The fourth path is the path "the first battery 103-> the first battery managing section 104-> the first voltage converting section 110-> the second battery managing section 109-> the second battery 108". Transmitting electric power through the fourth path transmits electric power from the first battery 103 to the second battery 108.

Electric power is transmitted from the first battery 103 to the second battery 108 in the case where the second battery 108 stores electric power in an amount smaller than a predetermined value when the second battery 108 supplies electric power directly to an auxiliary machine driving circuit included in an auxiliary machine.

Third, the second control section 111 gives an instruction to the second battery managing section 109 in order to cause the second battery 108 to be charged with electric power 100' supplied from outside the vehicle charging device 1b.

Fourth, the second control section 111 gives instructions to the second battery managing section 109, the first voltage converting section 110, and the first battery managing section 104 in order to cause the first battery 103 to be directly charged with electric power 100' supplied from outside the vehicle charging device 1b.

The second communication signal group 107 is transmitted and received, for the operation of the second control section 111, between the second control section 111, the second battery managing section 109, the first voltage converting section 110, the first battery managing section 104, and the first control section 105. With this arrangement, even when the first control section 105 is not in operation, the second control section 111 can give the above instructions to not only the second battery managing section 109 and the first voltage converting section 110 but also the first battery managing section 104 of the vehicle driving device 1a in order to (i) charge and discharge the first battery 103, (ii) charge and discharge the second battery 108, and (iii) transmit electric power between the first battery 103 and the second battery 108.

All the operation of the second control section 111 may alternatively be carried out by the first control section 105 for omission of the second control section 111. In this case, the first battery managing section 104 autonomously charges and discharges the first battery 103, whereas the second battery managing section 109 autonomously charges and discharges the second battery 108. Further, in the above case, the first battery managing section 104 and the second battery managing section 109 coordinate with each other by transmission and receipt of the second communication signal group 107. With this arrangement, even when the first control section 105 is not in operation, the first battery managing section 104 and the second battery managing section 109 can (i) charge and discharge the first battery 103, (ii) charge and discharge the second battery 108, and (iii) transmit electric power between the first battery 103 and the second battery 108.

The vehicle charging system 1_1 of the first embodiment of the present invention is, as described above, arranged as follows: The second battery managing section 109 is controlled by the second control section 111 provided in the vehicle charging device 1b independently of the first control section 105 provided in the vehicle driving device 1a, and thus causes the second battery 108 to be charged with electric power 100' supplied from outside the vehicle charging device 1b. Alternatively, the second battery managing section 109 autonomously causes the second battery 108 to be charged with electric power 100' supplied from outside the vehicle charging device 1b.

The vehicle charging system 1_1 can consequently, even when the first control section 105 is not in operation (that is, even in the state where the vehicle does not have an ignition key inserted therein), cause the second battery 108 to be charged with electric power 100' supplied from outside the vehicle charging device 1b.

Further, the vehicle charging system 1_1 of the first embodiment of the present invention is arranged as follows: The second control section 111, which is provided in the vehicle charging device 1b independently of the first control section 105 provided in the vehicle driving device 1a, controls the second battery managing section 109, the first voltage converting section 110, and the first battery managing section 104 for transmission of electric power between the first battery 103 and the second battery 108 through the third path or fourth path. Alternatively, the first battery managing section 104 and the second battery managing section 109 coordinate with each other for transmission of electric power between the first battery 103 and the second battery 108 through the third path or fourth path.

The vehicle charging system 1_1 consequently, even when the first control section 105 is not in operation (that is, even in the state where the vehicle does not have an ignition key inserted therein), allows transmission of electric power between the two batteries (namely, the second battery 108 as a sub-battery and the first battery 103 as a main battery).

By transmitting electric power from the second battery 108 to the first battery 103 when the first control section 105 is not in operation, the vehicle can, in the case of, for instance, receiving electric power from the outside while it is parked, store a larger amount of electric power from the outside for use in driving of the vehicle.

The above arrangement consequently makes it possible to provide a vehicle charging system 1_1 capable of highly efficient electric power transmission.

The vehicle charging system 1_1 of the first embodiment of the present invention also allows bidirectional transmission of electric power between the second battery 108 and the first battery 103 through the third path and the fourth path.

The vehicle charging system 1_1 can consequently, for use in driving of the vehicle, cause the first battery 103 to be charged with electric power 100' supplied from outside the vehicle charging device 1b, and also allows the second battery 108 (to which an auxiliary machine is often connected) to be supplied with electric power from the first battery 103 in the case where the second battery 108 stores an insufficient amount of electric power. This arrangement is particularly preferable in the case where the electric power 100' from the outside is small and unstable as in an output of a solar battery, because the second battery 108 is in such a case likely to have an insufficient amount of electric power.

The vehicle charging system 1_1 is preferably arranged such that when the vehicle charging device 1b is supplied with electric power 100' from outside the vehicle charging device 1b, the second battery managing section 109 can selectively supply the electric power 100', in correspondence with the amount of electric power stored in the second battery 108, to either the second battery 108 to charge it or directly to the first battery 103 through the first voltage converting section 110 and the first battery managing section 104 to charge the first battery 103.

More specifically, the vehicle charging system 1_1 is preferably arranged to (i) supply electric power 100' from outside the vehicle charging device 1b to the second battery 108 to charge it in the case where the second battery 108 stores an amount of electric power which amount is less than a predetermined charging level and to (ii) supply such electric power 100' directly to the first battery 103 to charge it in the case where the second battery 108 stores an amount of electric power which amount is not less than the predetermined charging level.

Alternatively, the vehicle charging system 1_1 is more preferably arranged to (i) supply electric power 100' from outside the vehicle charging device 1b to the second battery 108 to charge it in the case where the second battery 108 stores an amount of electric power which amount is less than a predetermined charging level and to (ii) transmit a predetermined amount of electric power from the second battery 108 to the first battery 103 through the third path once the amount of electric power stored in the second battery 108 has reached the predetermined charging level. In this case, continuous supply of electric power 100' from outside the vehicle charging device 1b causes electric power to be transmitted intermittently from the second battery 108 to the first battery 103.

Electric power 100' from the outside is preferably first supplied to the second battery 108 and then transmitted from the second battery 108 to the first battery 103 for the following reason: In the case where electric power 100' from outside the vehicle charging device 1b is supplied to the second battery 108, only at least the second battery managing section 109 is required to be in operation. In the case where electric power 100' from the outside is supplied directly to the first battery 103, on the other hand, at least the second battery managing section 109, the first voltage converting section 110, and the first battery managing section 104 are required to be in operation. The above arrangement can (i) reduce a time period necessary to transmit electric power from the second battery 108 to the first battery 103, and can consequently (ii) reduce power consumption necessary to supply electric power 100' from the outside to the vehicle charging system 1_1.

The above arrangement thus makes it possible to provide a vehicle charging system 1_1 capable of highly efficient electric power transmission. The above arrangement is particularly preferable in the case where the vehicle is supplied with a small and unstable amount of electric power for an extended period of time as in the case where the electric power 100' from the outside is an output of a solar battery, because such a case presents a major problem with power consumption necessary to charge a battery with electric power 100' from the outside.

Further, with the above arrangement, the first control section 105, which governs control of the entire vehicle driving device 1a and which has larger power consumption than does the first battery managing section 104, is not required to be in operation for transmission of electric power through the third path or fourth path. The above arrangement can thus not only (i) reduce power consumption, but also (ii) minimize electric power necessary for standby and (iii) improve efficiency in receiving natural energy.

The vehicle charging system 1_1 may be arranged such that while the first control section 105 is in operation, the second control section 111 receives (i) from the first battery managing section 104, a signal related to charging/discharging control for the first battery 103, and (ii) from the second battery managing section 109, a signal related to charging/discharging control for the second battery 108 and that the second control section 111, while communicating with the first control section 105, transmits electric power through the third path or fourth path.

The above arrangement allows, even when the first control section 105 is in operation (that is, even in the state where the vehicle has an ignition key inserted therein), electric power to be transmitted between the two batteries (namely, the second battery 108 as a sub-battery and the first battery 103 as a main battery).

(Electric Power Generating Device 112)

Figure 3:
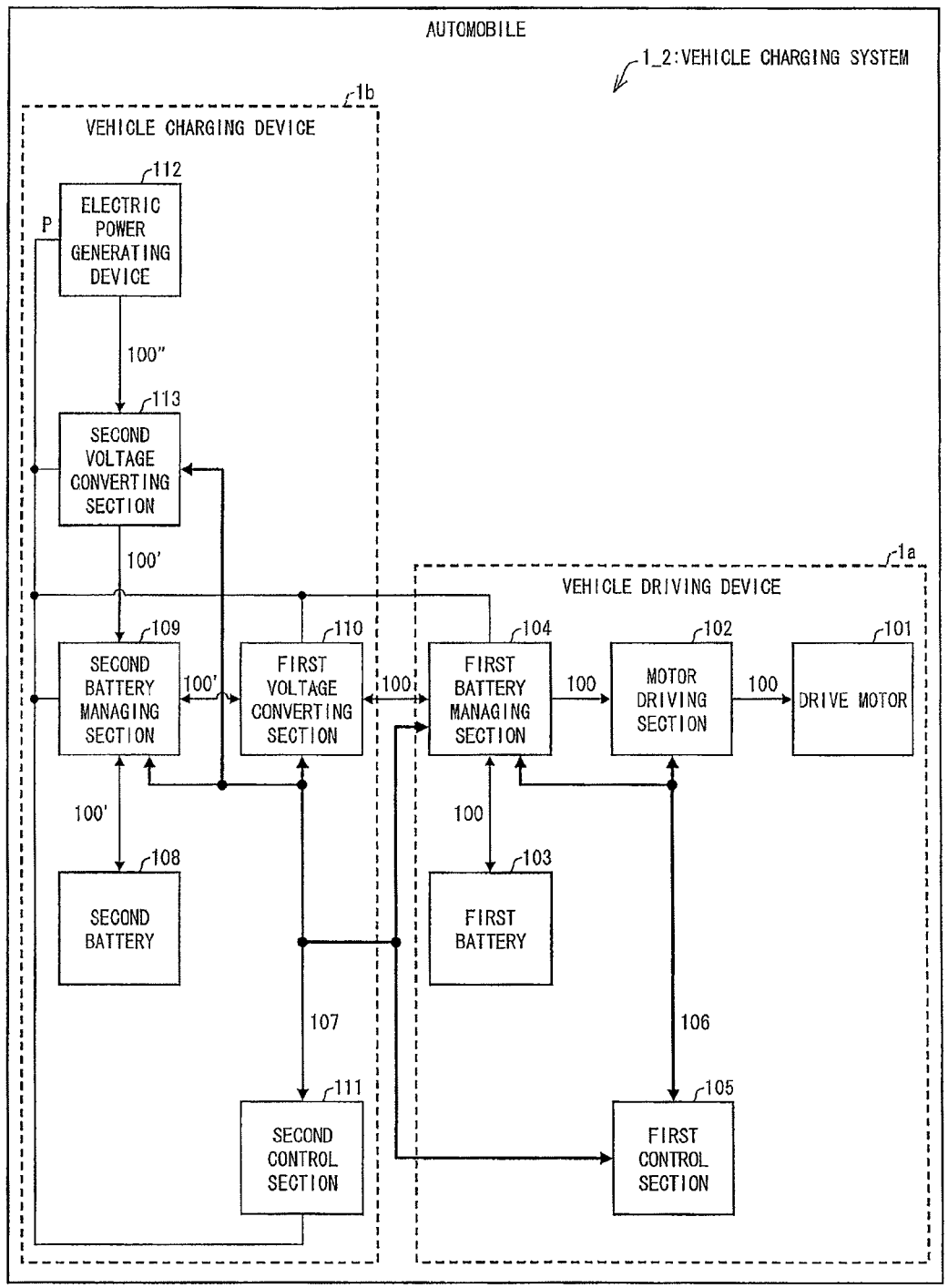
FIG. 3 is a block diagram illustrating another vehicle charging system of the first embodiment of the present invention.

The vehicle charging device 1b may further include an electric power generating device 112 and a second voltage converting section 113 (voltage converting section). FIG. 3 is a block diagram illustrating a vehicle charging system 1_2 of the first embodiment of the present invention. The vehicle charging system 1_2 is a vehicle charging system identical to the vehicle charging system 1_1 of FIG. 2 except that it further includes an electric power generating device 112 and a second voltage converting section 113.

The electric power generating device 112 generates electric power 100" (electric power having a voltage different from that of electric power transmitted through a below-mentioned predetermined path, the first path, and the second path), which is electric power having a voltage different from that of electric power 100. The electric power generating device 112 thus supplies the electric power 100" to the second voltage converting section 113.

The second voltage converting section 113 converts the voltage of electric power 100", supplied from the electric power generating device 112, to provide electric power 100', which is then supplied to the second battery 108 through the second battery managing section 109. The second voltage converting section 113 is, however, not essential in the above arrangement, and may be omitted in the case where the electric power 100" has a voltage close to that of the electric power 100'.

The use of the electric power generating device 112 and the second voltage converting section 113 allows electric power to be transmitted from outside the vehicle driving device 1a to the first battery 103 included in the vehicle driving device 1a as a main battery.

The second voltage converting section 113 is preferably arranged to be (i) in operation only during a period in which the electric power generating device 112 is generating a predetermined amount of electric power 100" (that is, an amount of electric power sufficient to be supplied from the electric power generating device 112 to the second battery 108) and (ii) not in operation during a period other than the above period.

The above arrangement makes it possible to provide a vehicle charging system 1_2 capable of highly efficient electric power transmission.

Further, the second voltage converting section 113 is preferably operated on electric power 100" generated by the electric power generating device 112.

The above arrangement allows the second voltage converting section 113 to operate only while the electric power generating device 112 is generating electric power 100". Further, the above arrangement allows the second voltage converting section 113 to directly consume electric power 100" generated by the electric power generating device 112, and thus makes it possible to, as compared to a case where the second voltage converting section 113 is supplied with electric power from the second battery 108, save electric power in an amount corresponding to a loss that would be caused by charging and discharging but for the above arrangement. The above arrangement consequently makes it possible to provide a vehicle charging system 1_2 capable of electric power transmission with higher efficiency.

The vehicle charging system 1_2 may be arranged such that the second battery managing section 109, the first voltage converting section 110, the second control section 111, or the first battery managing section 104 operates as supplied with not only electric power from the second battery 108 or the first battery 103, but also electric power generated by the electric power generating device 112.

The above arrangement allows the second battery managing section 109, the first voltage converting section 110, the second control section 111, or the first battery managing section 104 to directly consume electric power 100" generated by the electric power generating device 112. The above arrangement thus makes it possible to, as compared to a case where the second battery managing section 109, the first voltage converting section 110, the second control section 111, or the first battery managing section 104 is supplied with electric power from only the second battery 108 or the first battery 103, save electric power in an amount corresponding to a loss that would be caused by charging and discharging but for the above arrangement. The above arrangement consequently makes it possible to provide a vehicle charging system 1_2 capable of highly efficient electric power transmission.

The vehicle charging system 1_2 of the present embodiment has its main inventive feature in the vehicle charging device 1b. The electric power generating device 112 generates electric power 100", which then provides electric power 100' as a result of voltage conversion by the second voltage converting section 113. The second voltage converting section 113 thus supplies electric power 100', which is then transmitted to the second battery 108 through the second battery managing section 109 to be temporarily stored in the second battery 108.

The use of natural energy such as sunlight generates electric power that is small or unstable in amount. Thus, charging the second battery 108 with electric power 100" generated by the electric power generating device 112 is effective for stabilizing electric power supplied to the first battery 103.

(Auxiliary Machine 201)

In the case of an electric automobile, for example, the second battery 108 is used effectively, not as a power supply for driving the drive motor 101, but as a power supply in a system for driving an auxiliary machine 201 that is smaller in power consumption and lower in voltage than the drive motor 101. Such a system for driving an auxiliary machine 201 includes a power supply of, for example, 12 V. The auxiliary machine referred to herein is, for example, a headlamp, a power steering, an AV device, a car navigation system, an in-vehicle light, a direction indicator, a wiper, or a ventilation fan.

Figure 4:
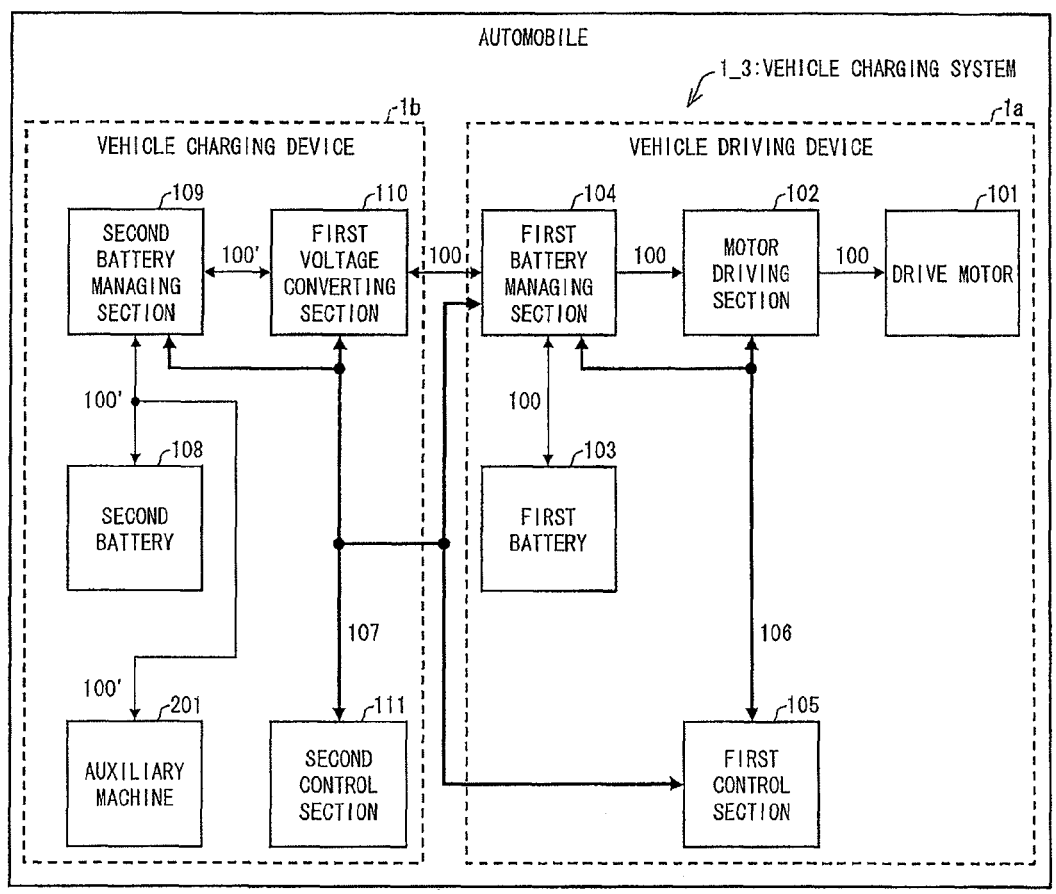
FIG. 4 is a block diagram illustrating still another vehicle charging system of the first embodiment of the present invention.

FIG. 4 is a block diagram illustrating a vehicle charging system 1_3 of the first embodiment of the present invention. The vehicle charging system 1_3 is identical to the vehicle charging system 1_1 of FIG. 2 except that it further includes an auxiliary machine 201.

Figure 5:
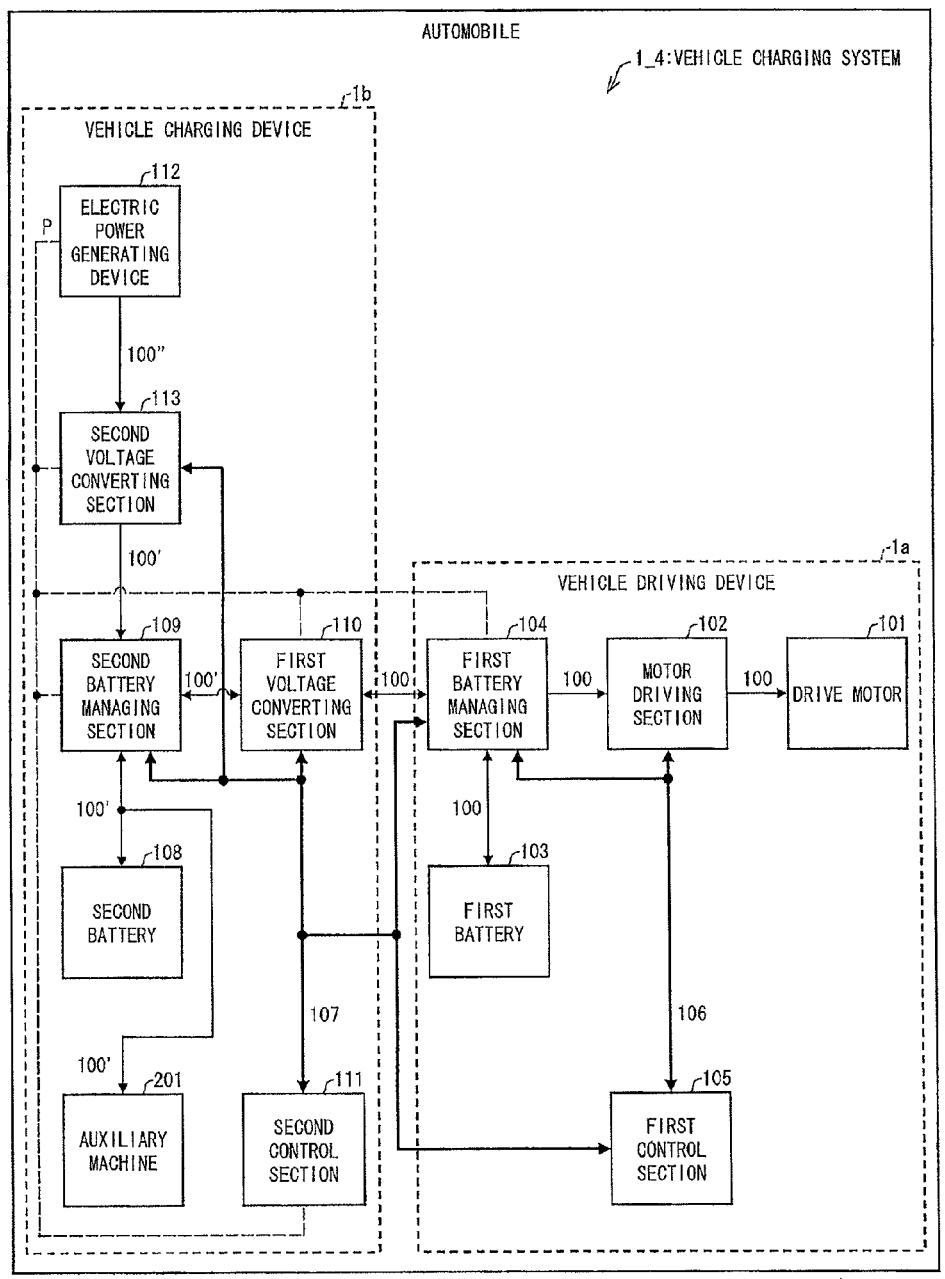
FIG. 5 is a block diagram illustrating still another vehicle charging system of the first embodiment of the present invention.

FIG. 5 is a block diagram illustrating a vehicle charging system 1_4 of the first embodiment of the present invention. The vehicle charging system 1_4 is identical to the vehicle charging system 1_2 of FIG. 3 except that it further includes an auxiliary machine 201.

The vehicle charging system 1_3 of FIG. 4 and the vehicle charging system 1_4 of FIG. 5 are each arranged such that the auxiliary machine 201 is connected to the second battery 108 and is supplied with electric power 100' from the second battery 108.

Further, the vehicle charging system 1_4 of FIG. 5 is arranged such that the second voltage converting section 113 is a voltage converting section for converting the voltage of electric power 100", generated by the electric power generating device 112, into a voltage (for example, 12 V) suitable for the auxiliary machine 201 to provide electric power 100'.

Conventional vehicle charging systems supply electric power from a 12 V battery to an auxiliary machine to drive it.

(Solar Photovoltaic Power Generating Device)

The electric power generating device 112 may be a solar photovoltaic power generating device. In this case, electric power can be transmitted from the solar photovoltaic power generating device to the first battery 103 and the second battery 108.

In the case where the electric power generating device 112 is a solar photovoltaic power generating device including a solar photovoltaic power generation panel (solar panel), this solar photovoltaic power generation panel can be in the shade as the vehicle is driven. In view of this, the solar photovoltaic power generation panel includes a plurality of electric power generating cells that are connected to one another in parallel and that are dispersedly located. The solar photovoltaic power generating device desirably (i) includes a plurality of electric power generating cells including as small a number as possible of electric power generating cells that are connected to one another in series, and thus (ii) has a low output voltage ranging from approximately 4 V to 8 V.

Since a single electric power generating element has merely a low output voltage, a solar photovoltaic power generating device typically includes (i) an electric power generating element group including a plurality electric power generating elements connected to one another in series or (ii) according to need, a solar photovoltaic power generation module as appropriate, in other words, a plurality of electric power generating elements connected to one another in series to provide a solar photovoltaic power generation module. This configuration (in which electric power generating elements are connected to one another in series) is, however, problematic in that variation (for example, variation caused by a shade) of light incident on some electric power generating elements may affect the entire solar photovoltaic power generation module.

For instance, if only some of the electric power generating elements connected to one another in series have become in the shade, there occurs an imbalance in irradiation area between the individual stages of the series. In the case where there is a variation in irradiation area between the individual electric power generating elements, those electric power generating elements connected to one another in series produce a current output that is limited by an electric power generating element for which the irradiation amount (that is, the amount of sunlight irradiation) is the smallest. This indicates that even a small shade may affect the entire module and thus largely limit the output. In particular, in the case of a solar photovoltaic power generating device installed in a vehicle, such a solar photovoltaic power generating device is not necessarily so positioned as to constantly receive ample solar irradiation, and tends to easily come under a shadow of, for example, a building or another vehicle.

Figure 14:
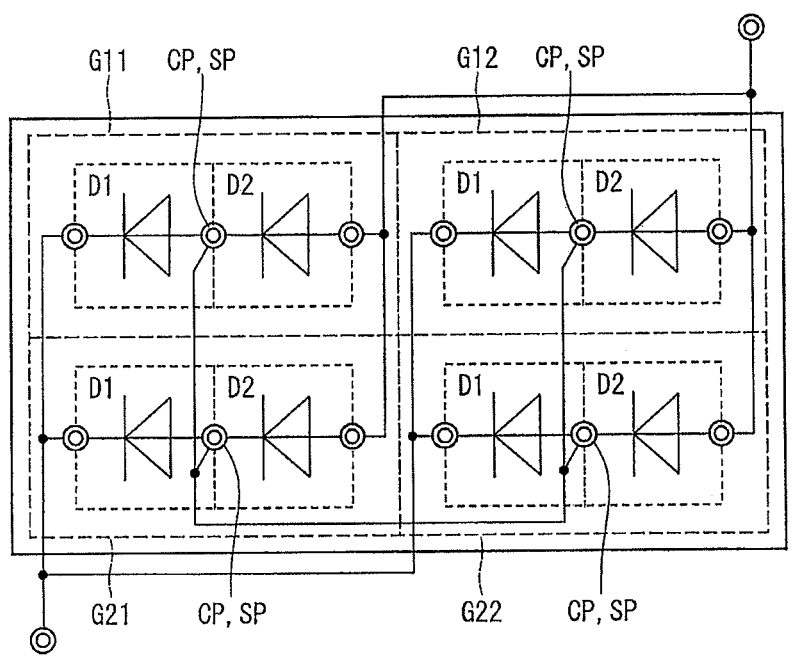
FIG. 14 is a circuit diagram illustrating an example configuration of a solar photovoltaic power generating device suitably usable in a vehicle charging system of the present invention.

To prevent the above influence, the solar photovoltaic power generating device is preferably configured as illustrated in FIG. 14, for example. The solar photovoltaic power generating device illustrated in FIG. 14 includes a plurality of group power generating sections G (namely, group power generating sections G11, G12, G21, and G22) each including unit power generating sections D (namely, unit power generating sections D1 and D2 each including either a single solar battery panel or a plurality of solar battery panels connected to one another) that convert light into electricity for electric power generation and that are connected to each other in series via a connection point CP, the group power generating sections G being connected to one another in parallel. Further, the group power generating sections G include specified connection points SP specified in advance among the connection points CP, the specified connection points SP of respective group power generating sections G being connected to one another.

Connecting and arranging unit power generating sections D as described above can prevent the output of a solar photovoltaic power generating device from decreasing largely in comparison to the area ratio of a shade.

In the case where, for instance, only the group power generating section G11 is in the shade, the output suffers from a decrease corresponding to a quarter (which is equal in proportion to the shaded area) of the output produced by solar irradiation on all the irradiation area. Similarly, in the case where the group power generating sections G11 and G12 are in the shade, the output suffers from a decrease corresponding to a half (which is again equal in proportion to the shaded area) of the output produced by solar irradiation on all the irradiation area. In the case where the group power generating sections G11 and G21 are in the shade, the output also suffers from a decrease corresponding to a half of the output produced by solar irradiation on all the irradiation area.

The above solar photovoltaic power generating device has an output of 0 only in the case where (i) all the four unit power generating sections D1 are in the shade or (ii) all the four unit power generating sections D2 are in the shade. This case involves two (particular) positions separated from each other being in the shade simultaneously. Such a situation, however, arises only with a relatively low probability.

The solar photovoltaic power generating device of the above example includes four pairs of unit power generating sections connected to each other in series, the four pairs being connected to one another in parallel. The numbers of parallel-series components are, however, not limited to those. Increasing the number of unit power generating sections connected in parallel and arranging them more randomly can further reduce the probability of an accidental shade pattern largely decreasing the output of the solar photovoltaic power generating device.

The above arrangement (i) reduces influence of variation (for example, variation caused by a shade) of irradiation light (sunlight), and (ii) even in the case where there has occurred variation of irradiation light, prevents an unbalance between an irradiation area and the area occupied by effective unit power generating sections. The above arrangement thus allows efficient electric power generation.

The present embodiment is preferably arranged, in relation to the charging of the second battery 108 with use of electric power 100" generated by the electric power generating device 112, such that when the amount of electric power 100' stored in the second battery 108 has exceeded a certain amount, the second battery 108 transmits a predetermined amount of such electric power to the first battery 103. This transmission involves the first voltage converting section 110 converting the voltage of the electric power 100' to provide electric power 100 as described above.

The present embodiment, stated differently, charges the second battery 108 and supplies electric power to the auxiliary machine 201 until the amount of electric power 100' stored in the second battery 108 reaches the above certain amount.

The present embodiment does not store electric power 100", generated by the electric power generating device 112, directly in the first battery 103 for the reason below.

First, when the vehicle is parked in a parking lot or the like, the first control section 105 is not in operation for the reason below.

While the vehicle driving device 1a including the first control section 105 is in operation (active), the vehicle consumes a large amount of electric power. It is thus inefficient to constantly and continuously transmit, to the first battery 103, electric power 100" generated by the electric power generating device 112 and having a relatively small amount.

When electric power 100' stored in the second battery 108 is transmitted to the first battery 103, the first voltage converting section 110 converts the voltage of the electric power 100' from that of the second battery 108 to that of the first battery 103.

The above two voltages are, for example, (i) 12 V (low voltage; described above) for the second battery 108 as a battery for an auxiliary machine, the battery driving an electrical component of the vehicle, and (ii) suitably a high voltage of 300 to 400 V or above (high voltage) for the first battery 103 in order to reduce a loss caused when the drive motor 101 is driven. Reducing such a loss involves increasing the voltage of electric power 100 (voltage×current) and decreasing the current thereof to reduce a conduction loss.

The second battery managing section 109 of the vehicle charging device 1b monitors the state of the second battery 108 for whether the second battery 108 is not overcharged or overdischarged, and thus controls charging of the second battery 108.

The second battery managing section 109, regardless of whether the ignition key is in the ON position or OFF position, charges the second battery 108 constantly while the electric power generating device 112 is generating electric power in an amount that is not less than a predetermined amount, and carries out the above monitoring and control at predetermined time intervals for prevention of overcharge and overdischarge.

The second battery managing section 109 carries out the above monitoring and control at predetermined time intervals for the following reason: First, the electric power generating device 112 generates electric power with use of natural energy. Thus, even while the vehicle is not in operation (that is, even in the case where the ignition key is in the OFF position), the electric power generating device 112 generates electric power. Further, since the electric power generating device 112 generates only a small amount of electric power, such electric power is desirably stored in the second battery 108 with as little a loss as possible; more desirably, such electric power is all stored in the second battery 108. For this reason, the second battery managing section 109 carries out the above monitoring and control at predetermined time intervals for prevention of overcharge and overdischarge.

The second battery 108 of the vehicle charging device 1b is charged until it stores electric power in the above certain amount, and thereafter transmits electric power to the first battery 103. The second control section 111 thus gives an instruction to the first voltage converting section 110, which, in response to that instruction, converts the voltage of the transmitted electric power from that of the second battery 108 to that of the first battery 103.

The second control section 111, to prevent overcharge and overdischarge of the first battery 103, obtains information about the state of the first battery 103 from the first battery managing section 104. The second control section 111 obtains this information according to need with use of the second communication signal group 107.

The second control section 111 recognizes the charging state of the first battery 103 as described above, and transmits electric power from the second battery 108 to the first battery 103 if possible.

With the above arrangement, even when the vehicle is parked in a parking lot or the like, the present embodiment can transmit electric power, based on electric power 100" generated by the electric power generating device 112, from the second battery 108 to the first battery 103 through the second voltage converting section 113.

The present embodiment may be arranged, as described above, such that (i) the first battery managing section 104 autonomously charges and discharges the first battery 103, whereas the second battery managing section 109 autonomously charges and discharges the second battery 108 or that (ii) the first battery managing section 104 and the second battery managing section 109 coordinate with each other by transmission and receipt of the second communication signal group 107. In this case, all the operation of the second control section 111 may be carried out by the first control section 105 for omission of the second control section 111.

As described above, the vehicle charging systems 1_2 and 1_4 of the first embodiment of the present invention can each, regardless of whether the ignition key is in the ON position or OFF position, (i) charge the second battery 108 with use of electric power 100" generated by the electric power generating device 112 and (ii) stop that charging.

Further, the vehicle charging systems 1_2 and 1_4 can each, regardless of whether the ignition key is in the ON position or OFF position, (i) transmit electric power from the second battery 108 to the first battery 103 and (ii) stop that transmission of electric power.

With the above arrangement, the vehicle charging systems 1_2 and 1_4 can each be described as a system capable of causing a battery to store electric power 100", generated by the electric power generating device 112, without waste as long as the battery has a remaining charging capacity.

(Electric Power Transmission by Electric Power Generating Device 112 to Vehicle Driving Device 1a)

The above-described vehicle charging systems each transmit electric power 100 to the vehicle driving device 1a through the vehicle charging device 1b. Electric power may alternatively be transmitted, not through the vehicle charging device 1b, but by the electric power generating device 112 to the vehicle driving device 1a.

Figure 6:
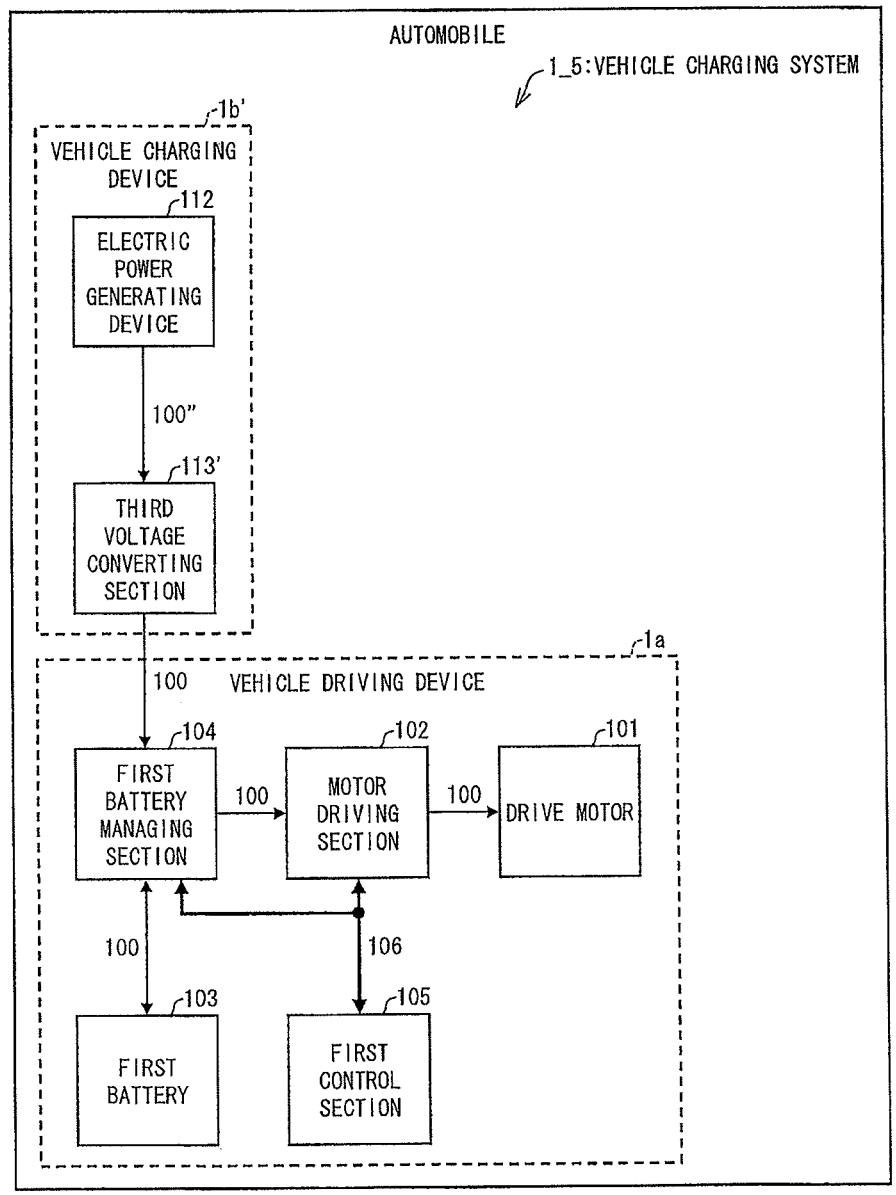
FIG. 6 is a block diagram illustrating still another vehicle charging system of the first embodiment of the present invention.

FIG. 6 is a block diagram illustrating a vehicle charging system 1_5 of the first embodiment of the present invention. The vehicle charging system 1_5 of FIG. 6 includes: a vehicle driving device 1a; an electric power generating device 112; and a third voltage converting section 113' (voltage converting section). The electric power generating device 112 and the third voltage converting section 113' constitute a vehicle charging device 1b'.

The electric power generating device 112 of FIG. 6 generates electric power 100" (electric power having a voltage different from that of electric power transmitted through the predetermined path), which is electric power having a voltage different from that of electric power 100. The electric power generating device 112 thus supplies the electric power 100" to the third voltage converting section 113'.

The third voltage converting section 113' converts the voltage of electric power 100", supplied from the electric power generating device 112, to provide electric power 100, which is then supplied to the first battery 103 through the first battery managing section 104. The third voltage converting section 113' is, however, not essential in the above arrangement, and may be omitted in the case where the electric power 100" has a voltage close to that of the electric power 100.

The use of the electric power generating device 112 and the third voltage converting section 113' allows electric power to be transmitted from outside the vehicle driving device 1a to the first battery 103 included in the vehicle driving device 1a as a main battery.

(Vehicle Driving Device 1a' Including Auxiliary Machine 201)

The above description defines the auxiliary machine 201 as being included in the vehicle charging device 1b. The present invention is, however, not limited to such an arrangement: The auxiliary machine 201 may alternatively be included in a vehicle driving device.

Figure 7:
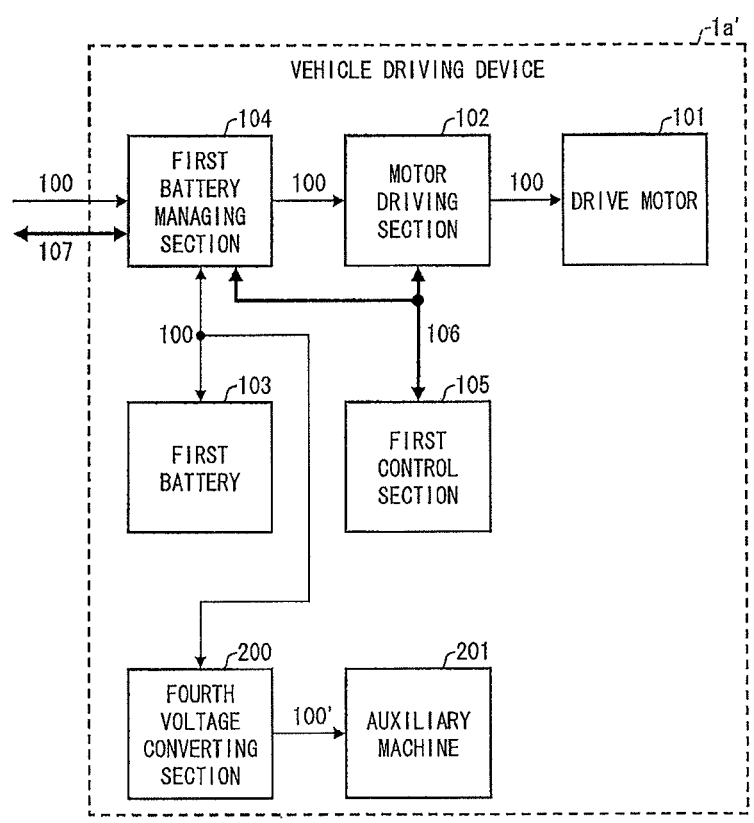
FIG. 7 is a block diagram illustrating another vehicle driving device of a first embodiment of the present invention.

FIG. 7 is a block diagram illustrating a vehicle driving device 1a' of the first embodiment of the present invention. The vehicle driving device 1a' of FIG. 7 includes: the vehicle driving device 1a of FIG. 1; an auxiliary machine 201; and a fourth voltage converting section 200.

The vehicle driving device 1a' of FIG. 7 is arranged as follows: The first battery 103 supplies electric power 100 to the fourth voltage converting section 200, which converts the voltage (for example, 24 V) of the electric power 100, supplied from the first battery 103, into a voltage (for example, 12 V) for electric power 100'. The fourth voltage converting section 200 then supplies the electric power 100' to the auxiliary machine 201. The fourth voltage converting section 200 is, however, not essential in the above arrangement, and may be omitted in the case where the electric power 100' has a voltage close to that of the electric power 100.

The above arrangement allows the vehicle driving device 1a' of FIG. 7 to also supply the auxiliary machine 201 with electric power 100' having a voltage (for example, 12 V) equal to that of electric power supplied by the second battery 108.

(Sequence of Charging Based on Solar Photovoltaic Power Generation)

The description below deals with an operation flow for a sequence of charging based on solar photovoltaic power generation. Such a sequence of charging based on solar photovoltaic power generation refers, for example, to an operation carried out by the vehicle charging system 1_2 of FIG. 3 or by the vehicle charging system 1_4 of FIG. 5 in the case where the electric power generating device 112 is a solar photovoltaic power generating device.

Figure 8:
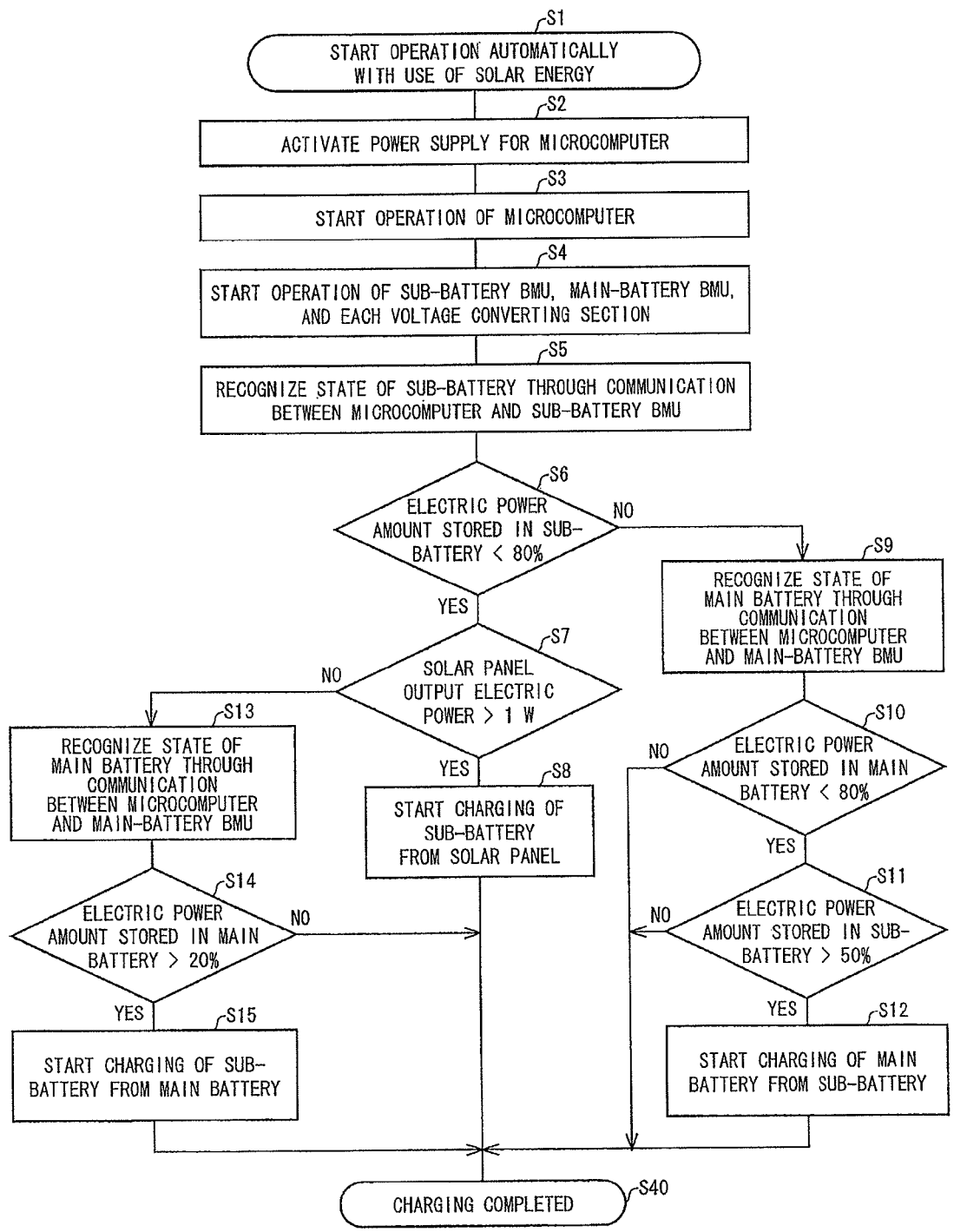
FIG. 8 is a flowchart illustrating a sequence of charging based on solar photovoltaic power generation in a vehicle charging system of the first embodiment of the present invention.

FIG. 8 is a flowchart illustrating an example sequence of charging that is carried out by a vehicle charging system of the first embodiment of the present invention and that is based on solar photovoltaic power generation. The description below deals with the flow illustrated in the flowchart of FIG. 8.

In each of the respective vehicle charging systems of FIGS. 3 and 5, either the second control section 111 or the second voltage converting section 113 includes a microcomputer mentioned below. The second battery 108 serves as a sub-battery, whereas the first battery 103 serves as a main battery. Further, in each of the respective vehicle charging systems of FIGS. 3 and 5, the second battery managing section 109 includes a battery management unit (BMU) for a sub-battery. In each of the respective vehicle charging systems of FIGS. 3 and 5, the first battery managing section 104 includes a BMU for a main battery.

In the flowchart of FIG. 8, the step S1 obtains solar energy (hereinafter referred to as "electric power P") on the basis of solar photovoltaic power generation by use of a solar photovoltaic power generating device. With use of this electric power P, the above vehicle charging system starts its operation.

The step S2 uses the electric power P, obtained in the step S1, to activate a power supply for starting up a microcomputer of the second control section 111. This power supply may be included in the electric power generating device 112 serving as a solar photovoltaic power generating device or in the second control section 111.

The step S3, as a result of activating the power supply in the step S2, starts an operation of the microcomputer included in the second control section 111.

The step S4 uses the electric power P, obtained in the step S1, to start the respective operations of the second voltage converting section 113, the sub-battery BMU included in the second battery managing section 109, the main-battery BMU included in the first battery managing section 104, and the first voltage converting section 110. This arrangement allows the vehicle charging system to be automatically activated with use of electric power P supplied from outside the vehicle driving device 1a (that is, electric power P supplied from the electric power generating device 112).

The first voltage converting section 110 may alternatively be activated later as necessary.

In a normal case where the sub-battery stores a sufficient amount of electric power, the above steps of the sequence may be carried out with use of electric power of the sub-battery. As described above, however, the vehicle charging system more desirably includes a plurality of electric power systems because such an arrangement makes it possible to handle various situations.

The step S5 involves the microcomputer and the sub-battery BMU communicating with each other with use of the second communication signal group 107. This allows the vehicle charging system to recognize the state of the second battery 108 serving as a sub-battery. After the recognition of the state, the sequence proceeds to the step S6.

The step S6 determines whether the amount of electric power stored in the sub-battery is less than 80% of the total capacity. If the amount of electric power stored in the sub-battery is less than 80% of the total capacity (YES in step S6), the sequence proceeds to the step S7. If the amount of electric power stored in the sub-battery is not less than 80% of the total capacity (No in step S6), the sequence proceeds to the step S9.

The step S7 determines whether a solar panel included in the electric power generating device 112 (solar photovoltaic power generating device) has an output electric power of greater than 1 W. If the output electric power of the solar panel is greater than 1 W (YES in step S7), the sequence proceeds to the step S8. If the output electric power of the solar panel is not greater than 1 W (NO in step S7), the sequence proceeds to the step S13.

The step S8 starts charging of the sub-battery from the solar panel. When the charging of the sub-battery from the solar panel has been completed, the sequence proceeds to the step S40, whereby the charging is completed.

The step S9 involves the microcomputer and the main-battery BMU communicating with each other with use of the second communication signal group 107. This allows the vehicle charging system to recognize the state of the first battery 103 serving as a main battery. After the recognition of the state, the sequence proceeds to the step S10.

The step S10 determines whether the amount of electric power stored in the main battery is less than 80% of the total capacity. If the amount of electric power stored in the main battery is less than 80% of the total capacity (YES in step S10), the sequence proceeds to the step S11. If the amount of electric power stored in the main battery is not less than 80% of the total capacity (No in step S10), the sequence proceeds to the step S40, whereby the charging is completed.

The step S11 determines whether the amount of electric power stored in the sub-battery is greater than 50% of the total capacity. If the amount of electric power stored in the sub-battery is greater than 50% of the total capacity (YES in step S11), the sequence proceeds to the step S12. If the amount of electric power stored in the sub-battery is not greater than 50% of the total capacity (No in step S11), the sequence proceeds to the step S40, whereby the charging is completed.

The step S12 starts charging of the main battery from the sub-battery. When the charging of the main battery from the sub-battery has been completed, the sequence proceeds to the step S40, whereby the charging is completed.

The step S13, to which the sequence proceeds if No in the step S7, involves the microcomputer and the main-battery BMU communicating with each other with use of the second communication signal group 107. This allows the vehicle charging system to recognize the state of the first battery 103 serving as a main battery. After the recognition of the state, the sequence proceeds to the step S14.

The step S14 determines whether the amount of electric power stored in the main battery is greater than 20% of the total capacity. If the amount of electric power stored in the main battery is greater than 20% of the total capacity (YES in step S14), the sequence proceeds to the step S15. If the amount of electric power stored in the main battery is not greater than 20% of the total capacity (No in step S14), the sequence proceeds to the step S40, whereby the charging is completed.

The step S15 starts charging of the sub-battery from the main battery. When the charging of the sub-battery from the main battery has been completed, the sequence proceeds to the step S40, whereby the charging is completed.

(Sequence of Charging of Sub-Battery from Solar Panel)

Figure 9:
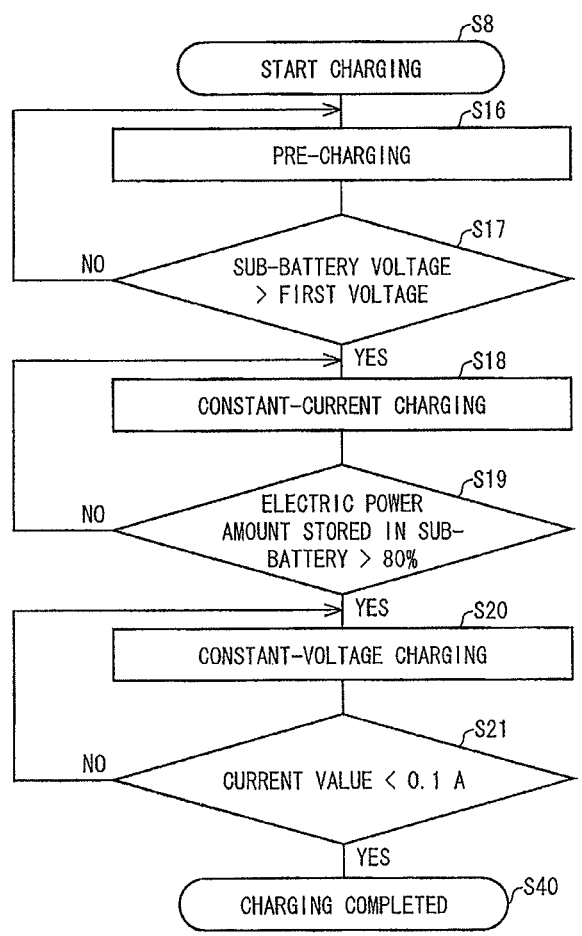
FIG. 9 is a flowchart illustrating a sequence of charging of a sub-battery from a solar panel in a vehicle charging system of the first embodiment of the present invention.

FIG. 9 is a flowchart illustrating a sequence of charging of a sub-battery from a solar panel in a vehicle charging system of the first embodiment of the present invention. The description below deals with the flow illustrated in the flowchart of FIG. 9.

After the step S8 has started charging of the sub-battery from the solar panel, the step S16 carries out pre-charging for a predetermined time period. The pre-charging refers to charging carried out before constant voltage charging and constant-current charging both described below. The pre-charging is charging carried out (i) in the case where the sub-battery has a voltage lower than a first voltage until the voltage of the sub-battery reaches the first voltage, and is carried out (ii) with use of a current having a value of approximately ½₀ of that for the constant-current charging. After the pre-charging has been carried out for the predetermined time period, the sequence proceeds to the step S17.

The step S17 determines whether the sub-battery has a voltage higher than the first voltage. If the sub-battery has a voltage higher than the first voltage (YES in step S17), the sequence proceeds to the step S18. If the sub-battery has a voltage of not higher than the first voltage (NO in step S17), the sequence returns to the step S16, and then the pre-charging is carried out again for the predetermined time period.

The "first voltage" mentioned in the above description refers to a lower-limit voltage for a battery in actual use. In the case where, for instance, the present embodiment manages charging and discharging of the sub-battery so that the sub-battery stores electric power in an amount of 20% to 80% of the total capacity, the first voltage corresponds to the voltage of the sub-battery storing electric power in an amount of 20% of the total capacity.

In the case where the sub-battery is a Li ion battery, it cannot be overdischarged or overcharged. Such a sub-battery stores electric power in an amount having representative values of 20% to 80% of the total capacity, and has a voltage having representative values of 330 V to 370 V. The above sub-battery thus has a first voltage having a representative value of 330 V.

In the case where the sub-battery is a Pb battery, it cannot be overdischarged, but can be overcharged. Such a sub-battery stores electric power in an amount having representative values of 50% to 100% of the total capacity, and has a voltage having representative values of 11.5 V to 13.5 V. The above sub-battery thus has a first voltage having a representative value of 11.5 V.

The step S18 carries out, for a predetermined time period, constant-current charging, which refers to charging carried out with use of supplied electric power having a constant current. After the constant-current charging has been carried out for the predetermined time period, the sequence proceeds to the step S19.

The step S19 determines whether the amount of electric power stored in the sub-battery is greater than 80% of the total capacity. If the amount of electric power stored in the sub-battery is greater than 80% of the total capacity (YES in step S19), the sequence proceeds to the step S20. If the amount of electric power stored in the sub-battery is not greater than 80% (NO in step S19), the sequence returns to the step S18, and then the constant-current charging is carried out again for the predetermined time period.

The step S20 carries out constant-voltage charging for a predetermined time period. The "constant-voltage charging" mentioned herein refers to (i) charging carried out with use of a current having a value according to an instruction from a battery managing section (that is, the second battery managing section 109) or (ii) charging carried out with use of supplied electric power having a constant voltage. After the constant-voltage charging has been carried out for the predetermined time period, the sequence proceeds to the step S21.

The step S21 determines whether the sub-battery has a current value of less than 0.1 A. If the sub-battery has a current value of less than 0.1 A (YES in step S21), the sequence proceeds to the step S40, whereby the charging is completed. If the sub-battery has a current value of 0.1 A or greater (NO in step S21), the sequence returns to the step S20, and then the constant-voltage charging is carried out again for the predetermined time period.

(Sequence of Charging from Sub-Battery to Main Battery)

Figure 10:
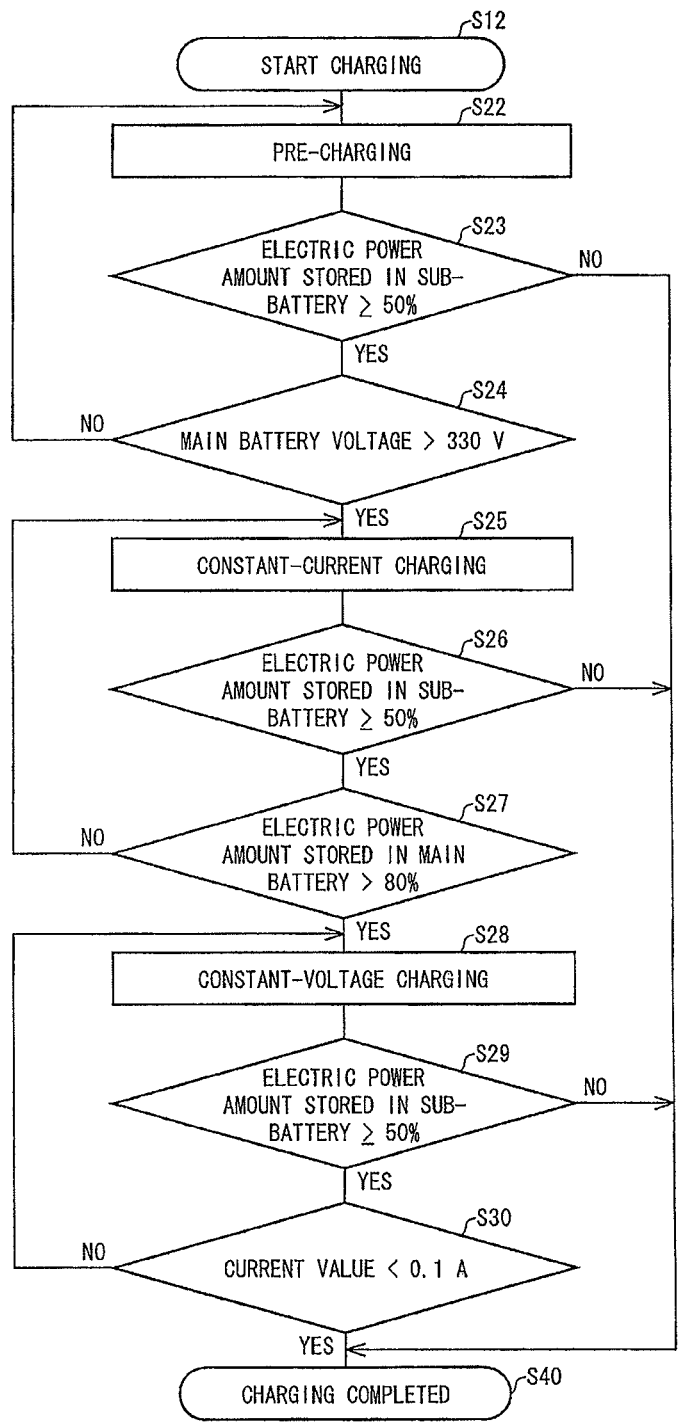
FIG. 10 is a flowchart illustrating a sequence of charging of a main battery from a sub-battery in a vehicle charging system of the first embodiment of the present invention.

FIG. 10 is a flowchart illustrating a sequence of charging of a main battery from a sub-battery in a vehicle charging system of the first embodiment of the present invention. The description below deals with the flow illustrated in the flowchart of FIG. 10.

After the step S12 has started charging of the main battery from the sub-battery, the step S22 carries out pre-charging for a predetermined time period. The pre-charging is as described above. After the pre-charging has been carried out for the predetermined time period, the sequence proceeds to the step S23.

The step S23 determines whether the amount of electric power stored in the sub-battery is smaller than 50% of the total capacity. If the amount of electric power stored in the sub-battery is 50% or greater (YES in step S23), the sequence proceeds to the step S24. If the amount of electric power stored in the sub-battery is smaller than 50% (NO in step S23), the sequence proceeds to the step S40, whereby the charging is completed.

The step S24 determines whether the main battery has a voltage higher than 330 V. If the main battery has a voltage higher than 330 V (YES in step S24), the sequence proceeds to the step S25. If the main battery has a voltage of not higher than 330 V (NO in step S24), the sequence returns to the step S22, and then the pre-charging is carried out again for the predetermined time period.

The step S25 carries out constant-current charging for a predetermined time period. The constant-current charging is as described above. After the constant-current charging has been carried out for the predetermined time period, the sequence proceeds to the step S26.

The step S26 determines whether the amount of electric power stored in the sub-battery is smaller than 50% of the total capacity. If the amount of electric power stored in the sub-battery is 50% or greater (YES in step. S26), the sequence proceeds to the step S27. If the amount of electric power stored in the sub-battery is smaller than 50% (NO in step S26), the sequence proceeds to the step S40, whereby the charging is completed.

The step S27 determines whether the amount of electric power stored in the main battery is greater than 80% of the total capacity. If the amount of electric power stored in the main battery is greater than 80% of the total capacity (YES in step S27), the sequence proceeds to the step S28. If the amount of electric power stored in the main battery is not greater than 80% of the total capacity (No in step S27), the sequence returns to the step S25, and then the constant-current charging is carried out again for the predetermined time period.

The step S28 carries out constant-voltage charging for a predetermined time period. The constant-voltage charging is as described above. After the constant-voltage charging has been carried out for the predetermined time period, the sequence proceeds to the step S29.

The step S29 determines whether the amount of electric power stored in the sub-battery is smaller than 50% of the total capacity. If the amount of electric power stored in the sub-battery is 50% or greater (YES in step S29), the sequence proceeds to the step S30. If the amount of electric power stored in the sub-battery is smaller than 50% (NO in step S29), the sequence proceeds to the step S40, whereby the charging is completed.

The step S30 determines whether the main battery has a current value of less than 0.1 A. If the main battery has a current value of less than 0.1 A (YES in step S30), the sequence proceeds to the step S40, whereby the charging is completed. If the main battery has a current value of not less than 0.1 A (NO in step S30), the sequence returns to the step S28, and then the constant-voltage charging is carried out again for the predetermined time period.

(Sequence of Charging of Sub-Battery from Main Battery)

Figure 11:
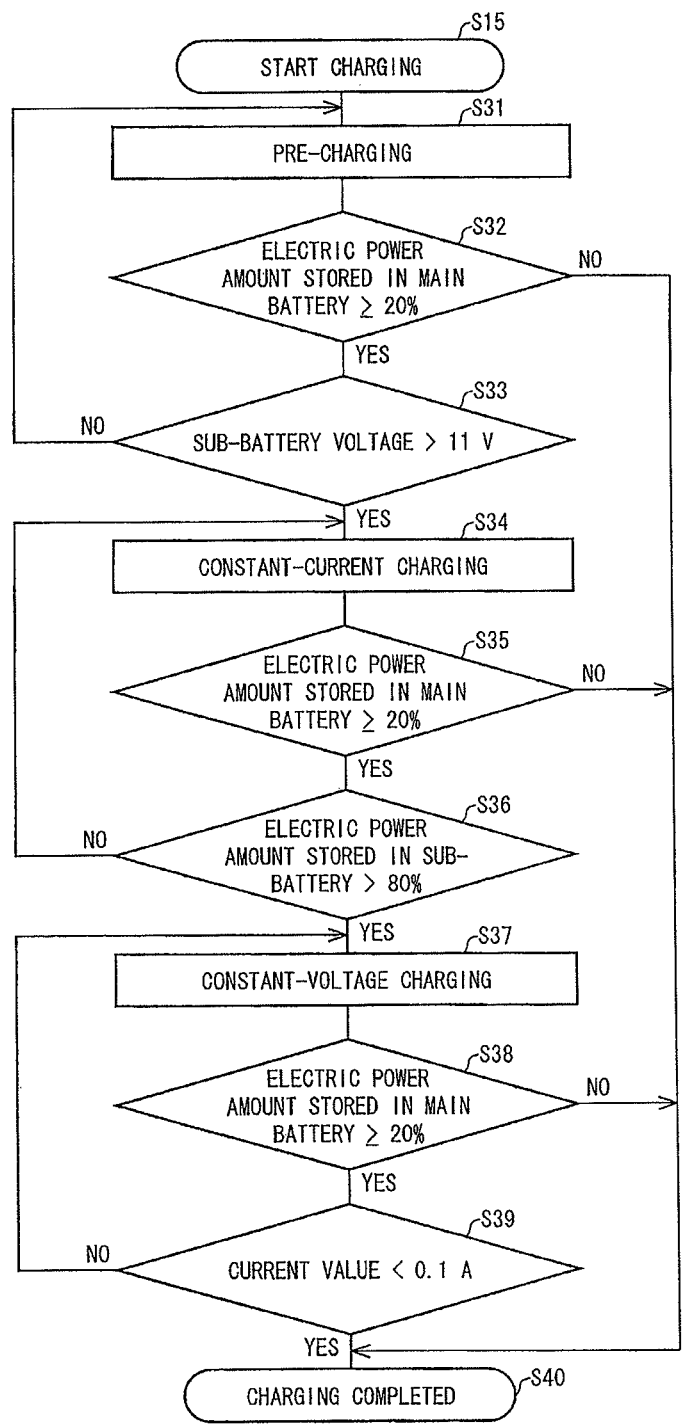
FIG. 11 is a flowchart illustrating a sequence of charging of a sub-battery from a main battery in a vehicle charging system of the first embodiment of the present invention.
Figure 12:
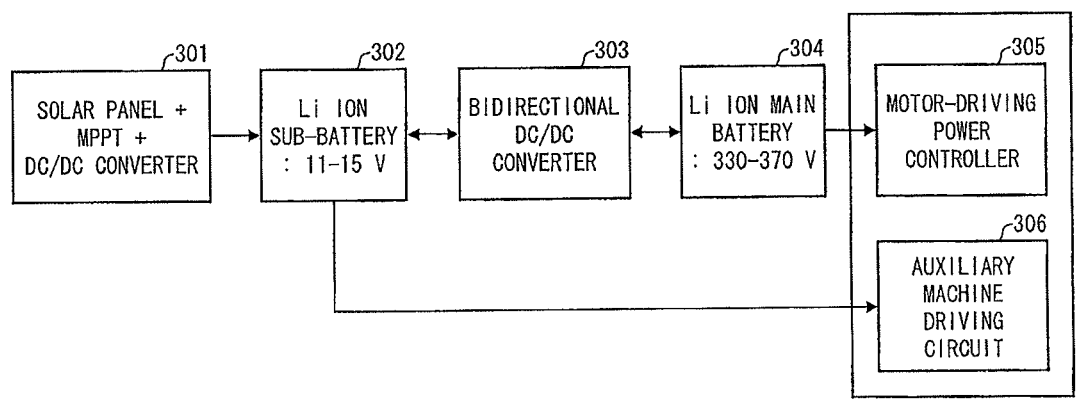
FIG. 12(a) is an explanatory diagram of a vehicle charging system for solar EV/HEV for use in different countries, and is a block diagram illustrating a vehicle charging system for EV/HEV for use in an industrialized country.
FIG. 12(b) is a an explanatory diagram of a vehicle charging system for solar EV/HEV for use in different countries, and is a block diagram illustrating a vehicle charging system for EV/HEV for use in a developing country.
Figure 12:
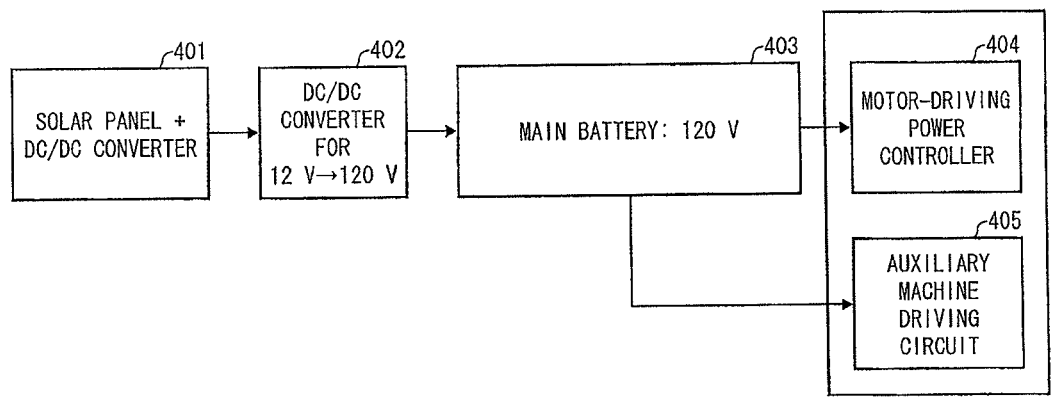
Figure 13:
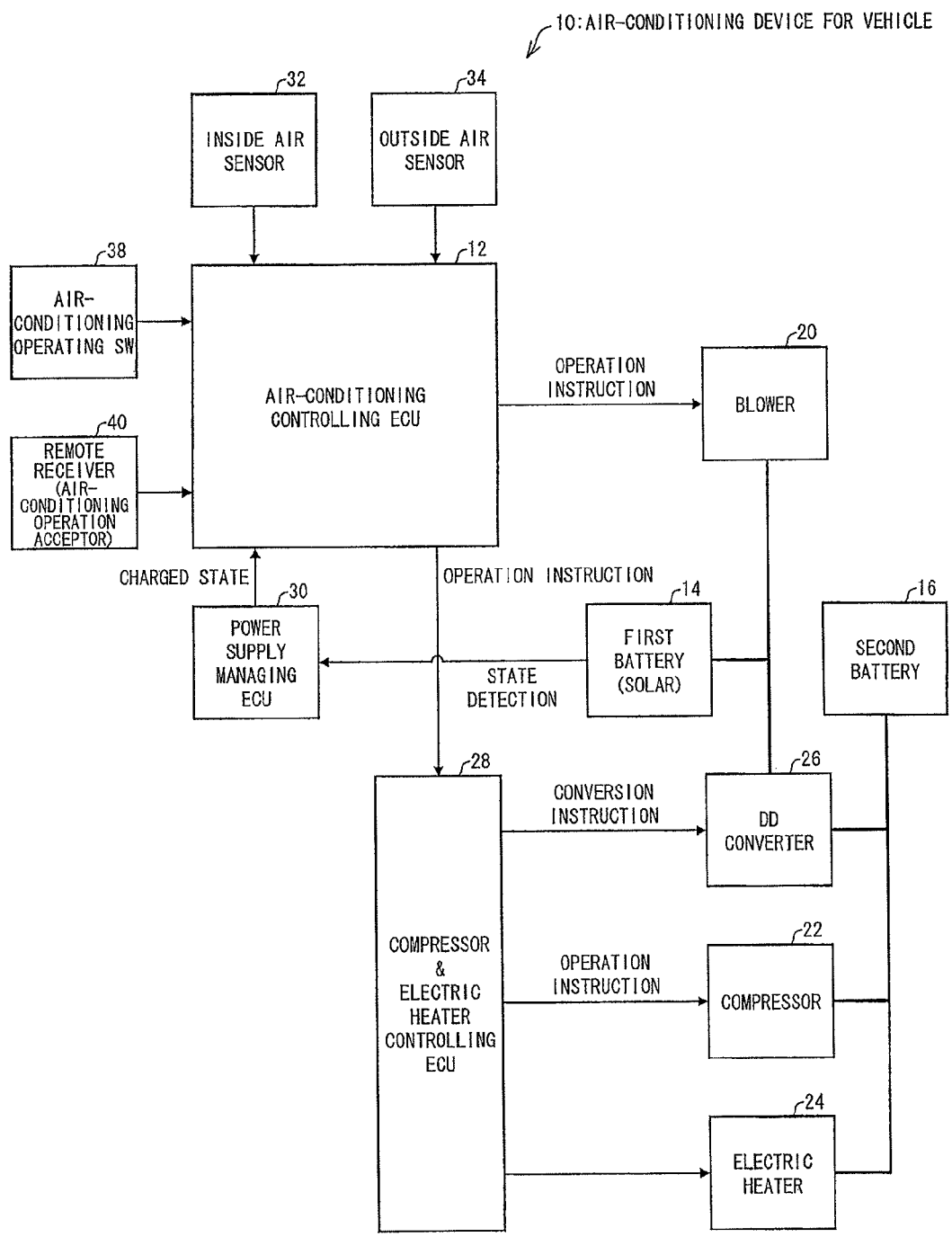
FIG. 13 is a diagram illustrating a system configuration of a conventional air-conditioning device for a vehicle, and corresponds to FIG. 1 of Patent Literature 1.

FIG. 11 is a flowchart illustrating a sequence of charging of a sub-battery from a main battery in a vehicle charging system of the first embodiment of the present invention. The description below deals with the flow illustrated in the flowchart of FIG. 11.

After the step S15 has started charging of the sub-battery from the main battery, the step S31 carries out pre-charging for a predetermined time period. The pre-charging is as described above. After the pre-charging has been carried out for the predetermined time period, the sequence proceeds to the step S32.

The step S32 determines whether the amount of electric power stored in the main battery is smaller than 20% of the total capacity. If the amount of electric power stored in the main battery is 20% or greater (YES in step S32), the sequence proceeds to the step S33. If the amount of electric power stored in the main battery is smaller than 20% (NO in step S32), the sequence proceeds to the step S40, whereby the charging is completed.

The step S33 determines whether the sub-battery has a voltage higher than 11 V. If the sub-battery has a voltage higher than 11 V (YES in step S33), the sequence proceeds to the step S34. If the sub-battery has a voltage of not higher than 11 V (NO in step S33), the sequence returns to the step S31, and then the pre-charging is carried out again for the predetermined time period.

The step S34 carries out constant-current charging for a predetermined time period. The constant-current charging is as described above. After the constant-current charging has been carried out for the predetermined time period, the sequence proceeds to the step S35.

The step S35 determines whether the amount of electric power stored in the main battery is smaller than 20% of the total capacity. If the amount of electric power stored in the main battery is 20% or greater (YES in step S35), the sequence proceeds to the step S36. If the amount of electric power stored in the sub-battery is smaller than 20% (NO in step S35), the sequence proceeds to the step S40, whereby the charging is completed.

The step S36 determines whether the amount of electric power stored in the sub-battery is greater than 80% of the total capacity. If the amount of electric power stored in the sub-battery is greater than 80% of the total capacity (YES in step S36), the sequence proceeds to the step S37. If the amount of electric power stored in the sub-battery is not greater than 80% of the total capacity (No in step S36), the sequence returns to the step S34, and then the constant-current charging is carried out again for the predetermined time period.

The step S37 carries out constant-voltage charging for a predetermined time period. The constant-voltage charging is as described above. After the constant-voltage charging has been carried out for the predetermined time period, the sequence proceeds to the step S38.

The step S38 determines whether the amount of electric power stored in the main battery is smaller than 20% of the total capacity. If the amount of electric power stored in the main battery is 20% or greater (YES in step S38), the sequence proceeds to the step S39. If the amount of electric power stored in the main battery is smaller than 20% (NO in step S38), the sequence proceeds to the step S40, whereby the charging is completed.

The step S39 determines whether the sub-battery has a current value of less than 0.1 A. If the sub-battery has a current value of less than 0.1 A (YES in step S39), the sequence proceeds to the step S40, whereby the charging is completed. If the sub-battery has a current value of not less than 0.1 A (NO in step S39), the sequence returns to the step S37, and then the constant-voltage charging is carried out again for the predetermined time period.

Table 1 below summarizes the respective charging sequences illustrated in FIGS. 8 through 11.

TABLE 1

| Electric power transmission | Solar panel | Sub-battery | Main battery |
| --- | --- | --- | --- |
| Solar panel -> sub-battery | ON state | >80% constant-voltage charging <80% constant-current charging | Power stored: any amount |
| Sub-battery -> main battery | ON state or OFF state | >50% | >80% constant-voltage charging <80% constant-current charging |

TABLE 1-continued

| Electric power transmission | Solar panel | Sub-battery | Main battery |
|---|---|---|---|
| Main battery -> sub-battery | ON state or OFF state | >80% constant-voltage charging <80% constant-current charging | >20% |

In Table 1 above, "Solar panel-> sub-battery" represents charging of a sub-battery from a solar panel. The "ON state" of the solar panel refers to a state in which the solar panel is irradiated with sunlight, so that a solar photovoltaic power generating device (that is, an electric power generating device) including this solar panel is generating electric power. The OFF state of the solar panel refers to a state in which the solar panel is irradiated with no sunlight, so that a solar photovoltaic power generating device (that is, an electric power generating device) including this solar panel is generating no electric power.

Further, in Table 1, "Sub-battery-> main battery" represents charging of a main battery from a sub-battery, whereas "Main battery-> sub-battery" represents charging of a sub-battery from a main battery. During each of these charging operations, the solar panel may be either in the ON state or OFF state.

In the case where the vehicle driving device or vehicle charging system described above is mounted, an electric automobile, a hybrid automobile, or a plug-in hybrid automobile has improved electricity mileage or improved gas mileage.

EXAMPLE

The description below deals with an Example of the present invention with reference to FIGS. 12(a) and 12(b). FIGS. 12(a) and 12(b) are each an explanatory diagram of a vehicle charging system for solar EV/HEV/PHEV for use in different countries. FIG. 12(a) is a block diagram illustrating a vehicle charging system for EV/HEV/PHEV for use in an industrialized country, whereas FIG. 12(b) is a block diagram illustrating a vehicle charging system for EV/HEV/PHEV for a developing country.

In the description above, "EV" stands for "electric vehicle" and refers to an electric automobile. Similarly, "HEV" stands for "hybrid electric vehicle" and refers to a hybrid car. Similarly, "PHEV" stands for "plug-in hybrid electric vehicle" and refers to a plug-in hybrid car.

(Vehicle Charging System for EV/HEV/PHEV for Industrialized Country)

The vehicle charging system of FIG. 12(a) for EV/HEV/PHEV for use in an industrialized country includes: a maximum electric power extracting panel system 301; a Li ion sub-battery 302; a bidirectional DC/DC converter 303; and a Li ion main battery 304. The vehicle driving device for EV/HEV/PHEV for use in an industrialized country further includes a motor-driving power controller 305 and an auxiliary machine driving circuit 306.

The vehicle charging system of FIG. 12(a) for EV/HEV/PHEV for use in an industrialized country corresponds to the vehicle charging system 1_4 of FIG. 5.

The maximum electric power extracting panel system 301 corresponds to a combination of the electric power generating device 112 and the second voltage converting section 113. The maximum electric power extracting panel system 301 includes: a solar panel; a MPPT system (maximum power point tracking system); and a DC/DC converter.

The Li ion sub-battery 302 corresponds to the second battery 108, and has a voltage ranging from 11 V to 15 V. The Li ion sub-battery 302 is an auxiliary battery capable of temporarily storing unstable solar energy.

The bidirectional DC/DC converter 303 corresponds to the first voltage converting section 110, and is capable of (i) boosting the voltage of electric power of the Li ion sub-battery 302 and (ii) transmitting the electric power to the Li ion main battery 304.

The Li ion main battery 304 corresponds to the first battery 103, and has a voltage ranging from 330 V to 370 V.

The motor-driving power controller 305 corresponds to the motor driving section 102. The auxiliary machine driving circuit 306 corresponds to a driving circuit connected to or built in the auxiliary machine 201.

With use of such a vehicle charging system for EV/HEV for use in an industrialized country, a vehicle having a weight of 1100 kg can drive 8500 km per year on only solar power (panel area: 5 $m^2$; solar cell electric power generation efficiency: 16%) at (i) an electricity mileage (which is indicative of the amount by which a vehicle can be driven on 1 kWh of electric energy) of 10 km/kWh and (ii) an electric power transmitting efficiency of 85%.

(Vehicle Charging System for EV/HEV/PHEV for Use in Developing Country)

The vehicle charging system of FIG. 12(b) for EV/HEV/PHEV for use in a developing country includes: a maximum electric power extracting panel system 401; a DC/DC converter 402; and a main battery 403 having a weight of approximately 100 kg. The vehicle driving device for EV/HEV/PHEV for use in a developing country further includes: a motor-driving power controller 404; and an auxiliary machine driving circuit 405.

The vehicle charging system of FIG. 12(b) for EV/HEV/PHEV for use in a developing country is a vehicle charging system corresponding to the vehicle charging system 1_5 of FIG. 6 and further including the fourth voltage converting section 200 and the auxiliary machine 201 of FIG. 7.

The maximum electric power extracting panel system 401 corresponds to the electric power generating device 112, and assumes the amount of solar irradiation in Mumbai, India (according to NASA data). The maximum electric power extracting panel system 401 is thus a system capable of securing a necessary amount of electric power generation with use of a small area.

The DC/DC converter 402 corresponds to the second voltage converting section 113, and is capable of boosting the voltage (12 V) of electric power of the maximum electric power extracting panel system 401 to 120 V.

The main battery 403 corresponds to the first battery 103, and includes an electric shock prevention system. The main battery 403 has an electric energy mount of (i) 3.5 kWh in the case of a Pb battery or (ii) 10 kWh in the case of a Li ion battery.

The motor-driving power controller 404 corresponds to the motor driving section 102. The auxiliary machine driving circuit 405 corresponds to a driving circuit connected to or built in the auxiliary machine 201.

With use of such a vehicle charging system for EV/HEV/PHEV for use in a developing country, a vehicle having a weight of 700 kg can drive 32 km per day on only solar power (panel area: 3 $m^2$; solar cell electric power generation efficiency: 16%) at (i) an electricity mileage of 13 km/kWh and (ii) an electric power transmitting efficiency of 85%.

During the constant-voltage charging carried out with use of a current having a value according to an instruction from a battery managing section (that is, the first battery managing section 104 or second battery managing section 109), the present embodiment (i) determines the fully charged state of a battery when, for instance, its current value is decreased to that for the pre-charging and thus (ii) completes the charging. The constant-voltage charging, in which supplied electric power has a constant voltage, has a voltage value equal to the upper-limit value among representative values for the battery.

The present embodiment may, after determining that a battery is fully charged, continue to carry out constant-voltage charging for approximately one (1) hour (additional charging mode).

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

The vehicle driving device of the present invention can be construed as a vehicle driving section. Such a vehicle driving section of the present invention may include: a drive motor for driving a vehicle; a motor driving section for driving the drive motor; a first battery for supplying driving electric power to the motor driving section; a first battery managing section for managing an amount of electric power stored in the first battery; and a first control section for providing an instruction to the motor driving section in order to control the driving of the drive motor, the first battery managing section communicating with outside in order to charge or discharge the first battery from the outside.

The above arrangement (i) allows the first battery managing section to be activated in response to an instruction signal from outside (even in the state where, for instance, a vehicle including the vehicle driving section has no ignition key inserted therein), and thus (ii) makes it possible to output, to the outside, a signal related to charging/discharging control.

Thus, the first battery managing section, as a response to the resulting admeasurement signal, allows the first battery to be charged from outside the vehicle driving section. This arrangement can in turn prevent overdischarge and overcharge of the first battery serving as a main battery.

Further, the above arrangement eliminates the need to operate the first control section, which governs control of the entire vehicle driving section and which consumes a larger amount of electric power than does the first battery managing section, in order for the first battery managing section to output a signal related to charging/discharging control. The above arrangement can thus reduce power consumption.

The above arrangement consequently makes it possible to provide a vehicle driving section that prevents overdischarge and overcharge of a main battery and that has reduced power consumption and improved power efficiency.

The vehicle charging system of the present invention may include: the vehicle driving section; and a vehicle charging section (vehicle charging device) including: a second battery for storing electric power supplied from outside the vehicle charging system; a second battery managing section for managing an amount electric power stored in the second battery; and a second control section for providing an instruction to each of the second battery managing section and the first battery managing section, the second control section controlling the first and second battery managing sections in order to transmit electric power through a first path or second path, the first path extending in a first direction from the second battery through the second battery managing section and the first battery managing section to the first battery, the second path extending in a second direction opposite to the first direction.

The above arrangement allows the second control section to control the first and second battery managing sections in order to transmit electric power through the first path or second path.

The above arrangement thus allows electric power to be transmitted between the two batteries (namely, the second battery serving as a sub-battery and the first battery serving as a main battery).

The above arrangement consequently makes it possible to provide a vehicle charging system capable of highly efficient electric power transmission.

Further, with the above arrangement, even in the case where the electric power supplied from outside the vehicle charging system has a small, unstable amount as in natural energy such as solar photovoltaic electric power, such electric power can be stored in the second battery for an increase and stability in amount.

In addition, with the above arrangement, the first control section, which governs control of the entire vehicle driving section and which consumes a larger amount of electric power than does the first battery managing section, is not required to be in operation for transmission of electric power through the first path or second path. The above arrangement can thus not only (i) reduce power consumption, but also (ii) minimize electric power necessary for standby and (iii) improve efficiency in receiving natural energy.

The vehicle driving section may further include: an electric power generating device for generating electric power; and a first voltage converting section so provided between the second battery managing section and the first battery managing section as to convert a voltage of the electric power stored in the second battery and to supply the first battery with the electric power as converted.

The use of the electric power generating device and the first voltage converting section allows electric power to be transmitted from outside the vehicle driving section to the first battery, which is a main battery included in the vehicle driving section.

The vehicle charging system may be arranged such that the electric power generating device generates electric power having a voltage different from a voltage of electric power transmitted through (i) a predetermined path extending from the first battery through the first battery managing section to the motor driving section, (ii) the first path, and (iii) the second path, and that the vehicle charging section further includes a second voltage converting section for converting the different voltage of the electric power, supplied by the electric power generating device, to provide electric power to be transmitted through the first path and the second path.

The use of the electric power generating device and the second voltage converting section allows electric power to be transmitted from outside the vehicle driving section to the first battery serving as a main battery included in the vehicle driving section.

The vehicle charging system may be arranged such that the electric power generating device is a solar photovoltaic power generating device. This arrangement allows electric power to be transmitted from a solar photovoltaic power generating device to the first battery and to the second battery.

The vehicle charging system may be arranged such that the first battery managing section, the second battery managing section, and the second control section each operate on electric power supplied from outside the vehicle driving section or on electric power supplied by the electric power generating device.

The above arrangement allows the vehicle charging system to be automatically activated with use of electric power supplied from outside the vehicle driving section or electric power supplied by the electric power generating device.

Further, a vehicle charging system and the like of an embodiment of the present invention can be construed as described below.

A vehicle charging system of the present invention includes: the vehicle driving device of the present invention; and a vehicle charging device including: a second battery managing section for managing an amount of electric power stored in a second battery that stores electric power supplied from outside the vehicle charging system; and a second control section for providing an instruction to the second battery managing section, the second control section, while the first control section is not in operation, controlling the second battery managing section in order to charge or discharge the second battery.

With the above arrangement, the second battery managing section is controlled by the second control section provided in the vehicle charging device independently of the first control section provided in the vehicle driving device, and thus allows the second battery to be (i) charged with electric power supplied from outside the vehicle charging device or (ii) discharged. The above arrangement thus allows, even while the first control section is not in operation, the second battery to be charged with electric power supplied from outside the vehicle charging device. The above arrangement consequently makes it possible to provide a vehicle charging system capable of highly efficient electric power transmission.

A vehicle charging system of the present invention includes: the vehicle driving device of the present invention; and a vehicle charging device including: a second battery managing section for managing an amount of electric power stored in a second battery that stores electric power supplied from outside the vehicle charging system, the second battery managing section, while the first control section is not in operation, autonomously charging or discharging the second battery.

With the above arrangement, the second battery managing section autonomously allows the second battery to be (i) charged with electric power supplied from outside the vehicle charging device or (ii) discharged. The above arrangement consequently makes it possible to provide a vehicle charging system capable of highly efficient electric power transmission.

A vehicle charging system of the present invention includes: the vehicle driving device of the present invention; and a vehicle charging device including: a second battery managing section for managing an amount of electric power stored in a second battery that stores electric power supplied from outside the vehicle charging system; and a second control section for providing an instruction to the second battery managing section, the second control section, while the first control section is not in operation, controlling the first battery managing section and the second battery managing section in order to transmit electric power from the second battery to the first battery.

With the above arrangement, the second control section, while the first control section is not in operation, controls the first battery managing section and the second battery managing section in order to transmit electric power from the second battery to the first battery. The above vehicle charging system can thus, even while the first control section is not in operation, (i) store more electric power supplied from outside, and (ii) use such electric power to drive the vehicle. The above arrangement consequently makes it possible to provide a vehicle charging system capable of highly efficient electric power transmission.

A vehicle charging system of the present invention includes: the vehicle driving device of the present invention; and a vehicle charging device including: a second battery managing section for managing an amount of electric power stored in a second battery that stores electric power supplied from outside the vehicle charging system, the first battery managing section and the second battery managing section, while the first control section is not in operation, coordinating with each other in order to transmit electric power from the second battery to the first battery.

With the above arrangement, the first battery managing section and the second battery managing section, while the first control section is not in operation, coordinate with each other in order to transmit electric power from the second battery to the first battery. The above vehicle charging system can thus, even while the first control section is not in operation, (i) store more electric power supplied from outside, and (ii) use such electric power to drive the vehicle. The above arrangement consequently makes it possible to provide a vehicle charging system capable of highly efficient electric power transmission.

The vehicle charging system may be arranged such that electric power is transmitted bidirectionally (i) from the second battery to the first battery and (ii) from the first battery to the second battery.

The above arrangement allows the first battery to be charged with electric power supplied from outside the vehicle charging device, and thus allows such electric power to be used to drive the vehicle. The above arrangement further allows the second battery, in the case where it stores an insufficient amount of electric power, to be supplied with electric power from the first battery.

The vehicle charging system may be arranged such that the vehicle charging device further includes an electric power generating device for generating electric power, the electric power generating device being connected to the second battery managing section.

The vehicle charging system may further be arranged such that the vehicle charging device further includes a voltage converting section for converting a voltage of the electric power generated by the electric power generating device, the voltage converting section being so connected to the electric power generating device and the second battery managing section as to be interposed therebetween; and the voltage converting section operates on the electric power generated by the electric power generating device.

The above arrangement allows the voltage converting section to directly consume electric power generated by the electric power generating device, and thus makes it possible to, as compared to a case where the voltage converting section is supplied with electric power from the second battery, save electric power in an amount corresponding to a loss that would be caused by charging and discharging but for the above arrangement. The above arrangement consequently makes it possible to provide a vehicle charging system capable of electric power transmission with higher efficiency.

The vehicle charging system may further be arranged such that the vehicle charging device further includes an electric power generating device for generating electric power, the electric power generating device being connected to the second battery managing section; and the electric power generated by the electric power generating device is first stored in the second battery and then transmitted from the second battery to the first battery.

The above arrangement can reduce a time necessary for a process of transmitting electric power from the second battery to the first battery, the process consuming a larger amount of electric power. The above arrangement can thus reduce power consumption necessary to store electric power generated by the electric power generating device. The above arrangement consequently makes it possible to provide a vehicle charging system capable of highly efficient electric power transmission.

The vehicle charging system may further be arranged such that the electric power generating device is a solar photovoltaic power generating device.

The above arrangement includes a solar photovoltaic power generating device, which is suitable as an electric power generating device for the vehicle charging system of the present invention. The above arrangement consequently makes it possible to provide a vehicle charging system capable of highly efficient electric power transmission.

The vehicle charging system may preferably be arranged such that the solar photovoltaic power generating device includes a plurality of solar photovoltaic power generating elements; and the plurality of solar photovoltaic power generating elements are connected to one another in a series-parallel pattern.

The above arrangement uses a solar photovoltaic power generating device, which does not suffer from a significant output decrease even if partially shaded, in a vehicle charging system that is shaded by a pattern having a constantly changing shape and area. The above arrangement consequently makes it possible to provide a vehicle charging system capable of electric power transmission with particularly high efficiency.

An automobile of the present invention includes: the vehicle driving device of the present invention.

The above arrangement can improve electricity mileage and gas mileage of an automobile. The present invention is applicable to such automobiles as an electric automobile, a hybrid automobile, and a plug-in hybrid automobile.

A vehicle driving device and the like of an embodiment of the present invention are different from Patent Literature 1 as follows: Patent Literature 1 uses solar electric power to perform control over air-conditioning carried out by a compressor or electric heater. A vehicle driving device and the like of an embodiment of the present invention, in contrast, provide a system that allows electric power from outside to be used as driving electric power for an automobile.

INDUSTRIAL APPLICABILITY

The vehicle driving device and vehicle charging system of the present invention are applicable to an electric automobile, and are particularly suitably applicable to EV/HEV/PHEV for use in an industrialized country or to EV/HEV/PHEV for use in a developing country.

REFERENCE SIGNS LIST

1_1, 1_2, 1_3, 1_4, 1_5 vehicle charging system
1a vehicle driving device
1a' vehicle driving device
1b vehicle charging device
1b' vehicle charging device
100, 100', 100" electric power
101 drive motor
102 motor driving section
103 first battery
104 first battery managing section
105 first control section
106 first communication signal group
107 second communication signal group
108 second battery
109 second battery managing section
110 first voltage converting section
111 second control section
112 electric power generating device
113 second voltage converting section (voltage converting section)
113' third voltage converting section (voltage converting section)
200 fourth voltage converting section
201 auxiliary machine
301 maximum electric power extracting panel system
302 Li ion sub-battery
303 bidirectional DC/DC converter
304 Li ion main battery
305 motor-driving power controller
306 auxiliary machine driving circuit
401 maximum electric power extracting panel system
402 DC/DC converter
403 main battery
404 motor-driving power controller
405 auxiliary machine driving circuit
G11, G12, G21, G22 group power generating section
D1, D2 unit power generating section
CP connection point
SP specified connection point
P electric power
S1 to S40 step

The invention claimed is:
1. A vehicle charging system comprising:
a vehicle driving device; and
a vehicle charging device including:
a second battery managing section for managing an amount of electric power stored in a second battery that stores electric power supplied from outside the vehicle charging system; and
a second control section for providing an instruction to the second battery managing section,
the second control section, while the first control section is not in operation, controlling the first battery managing section and the second battery managing section in order to transmit electric power from the second battery to the first battery,
wherein the vehicle charging device further includes a solar photovoltaic power generating device for generating electric power, the solar photovoltaic power generating device being connected to the second battery managing section; and
the electric power generated by the solar photovoltaic power generating device is first stored in the second battery and then transmitted from the second battery to the first battery.
2. A vehicle charging system comprising:
a vehicle driving device; and
a vehicle charging device including:
a second battery managing section for managing an amount of electric power stored in a second battery that stores electric power supplied from outside the vehicle charging system,
the first battery managing section and the second battery managing section, while the first control section is not in operation, coordinating with each other in order to transmit electric power from the second battery to the first battery,
wherein the vehicle charging device further includes a solar photovoltaic power generating device for generat- ing electric power, the solar photovoltaic power generating device being connected to the second battery managing section; and the electric power generated by the solar photovoltaic power generating device is first stored in the second battery and then transmitted from the second battery to the first battery.

3. The vehicle charging system according to claim 1, wherein:

electric power is transmitted bidirectionally (i) from the second battery to the first battery and (ii) from the first battery to the second battery.

4. The vehicle charging system according to claim 2, wherein:

electric power is transmitted bidirectionally (i) from the second battery to the first battery and (ii) from the first battery to the second battery.

5. The vehicle charging system according to claim 1, wherein:

the solar photovoltaic power generating device includes a plurality of solar photovoltaic power generating elements; and the plurality of solar photovoltaic power generating elements are connected to one another in a series-parallel pattern.

6. The vehicle charging system according to claim 2, wherein:

the solar photovoltaic power generating device includes a plurality of solar photovoltaic power generating elements; and the plurality of solar photovoltaic power generating elements are connected to one another in a series-parallel pattern.

* * * * *